US010863102B2

(12) United States Patent
Yoneda et al.

(10) Patent No.: US 10,863,102 B2
(45) Date of Patent: Dec. 8, 2020

(54) BLADE OPENING/CLOSING APPARATUS AND IMAGE PICKUP APPARATUS TO SECURE FAVORABLE PHOTOGRAPHING STATES BY USE OF A BIASING SPRING AND MAGNETIC DRIVING PORTION FOR SETTING A ROTATION POSITION ASSOCIATED WITH LOCKED/UNLOCKED STATES

(71) Applicant: SONY CORPORATION, Tokyo (JP)

(72) Inventors: Masafumi Yoneda, Tokyo (JP); Toshiro Hayashi, Chiba (JP)

(73) Assignee: SONY CORPORATION, Tokyo (JP)

( * ) Notice: Subject to any disclaimer, the term of this patent is extended or adjusted under 35 U.S.C. 154(b) by 175 days.

(21) Appl. No.: 15/779,242

(22) PCT Filed: Oct. 24, 2016

(86) PCT No.: PCT/JP2016/081444
§ 371 (c)(1),
(2) Date: May 25, 2018

(87) PCT Pub. No.: WO2017/104265
PCT Pub. Date: Jun. 22, 2017

(65) Prior Publication Data
US 2018/0352133 A1 Dec. 6, 2018

(30) Foreign Application Priority Data

Dec. 15, 2015 (JP) ................................. 2015-244072

(51) Int. Cl.
H04N 5/235 (2006.01)
H04N 5/232 (2006.01)
(Continued)

(52) U.S. Cl.
CPC ............. *H04N 5/2353* (2013.01); *G03B 9/42* (2013.01); *H02K 7/06* (2013.01); *H02K 7/1023* (2013.01);
(Continued)

(58) Field of Classification Search
CPC ... G03B 9/42; G03B 9/36; H02K 7/06; H02K 7/1023; H02K 7/1021; H04N 5/2254;
(Continued)

(56) References Cited

U.S. PATENT DOCUMENTS 6,726,379 B2 * 4/2004 Watabe ................... G03B 9/08
396/456
6,899,473 B2 * 5/2005 Kudo ...................... G03B 9/18
396/456
(Continued)

FOREIGN PATENT DOCUMENTS

JP 2015-143744 A 8/2015

OTHER PUBLICATIONS

International Search Report and Written Opinion of PCT Application No. PCT/JP2016/081444, dated Jan. 17, 2017, 07 pages of ISRWO.

Primary Examiner — Twyler L Haskins
Assistant Examiner — Akshay Trehan
(74) Attorney, Agent, or Firm — Chip Law Group

(57) ABSTRACT

To secure a favorable photographing state without causing an increase of power consumption. A blade opening/closing apparatus includes a magnetic driving portion including a coil to which a driving current is supplied and a magnet that is rotated along with energization to the coil; a driving body that includes a to-be-locked portion and is operated by the magnetic driving portion; an opening/closing blade that opens/closes an aperture by an operation of the driving body; and a lock portion that sets a locked state of the
(Continued)

opening/closing blade by engaging with the to-be-locked portion, the setting of the locked state and a release of the locked state being carried out in accordance with a rotation position of the magnet. Accordingly, since the lock portion engages with the to-be-locked portion to thus set the locked state and unlock the locked state in accordance with the rotation position of the magnet and locking with respect to the opening/closing blade is not performed by a magnetic force of the magnet, a favorable photographing state can be secured without causing an increase of power consumption.

13 Claims, 30 Drawing Sheets

(51) Int. Cl.
| | |
|---|---|
| H04N 5/225 | (2006.01) |
| H04N 5/238 | (2006.01) |
| G03B 9/42 | (2006.01) |
| H02K 7/06 | (2006.01) |
| H02K 7/102 | (2006.01) |

(52) U.S. Cl.
CPC ..... *H04N 5/2254* (2013.01); *H04N 5/232411* (2018.08); *H04N 5/2253* (2013.01); *H04N 5/238* (2013.01)

(58) Field of Classification Search
CPC ........... H04N 5/232411; H04N 5/2353; H04N 5/2253; H04N 5/238
USPC .......................................................... 396/456
See application file for complete search history.

(56) References Cited

U.S. PATENT DOCUMENTS

| | | | | |
|---|---|---|---|---|
| 2010/0202770 | A1* | 8/2010 | Kihara | G03B 9/14 396/493 |
| 2015/0109523 | A1* | 4/2015 | Tanaka | G03B 9/42 348/367 |
| 2016/0026069 | A1* | 1/2016 | Togo | G03B 9/64 396/456 |

* cited by examiner

BLADE OPENING/CLOSING APPARATUS AND IMAGE PICKUP APPARATUS TO SECURE FAVORABLE PHOTOGRAPHING STATES BY USE OF A BIASING SPRING AND MAGNETIC DRIVING PORTION FOR SETTING A ROTATION POSITION ASSOCIATED WITH LOCKED/UNLOCKED STATES

CROSS REFERENCE TO RELATED APPLICATIONS

This application is a U.S. National Phase of International Patent Application No. PCT/JP2016/081444 filed on Oct. 24, 2016, which claims priority benefit of Japanese Patent Application No. JP 2015-244072 filed in the Japan Patent Office on Dec. 15, 2015. Each of the above-referenced applications is hereby incorporated herein by reference in its entirety.

TECHNICAL FIELD

The present technology relates to a technical field regarding a blade opening/closing apparatus that includes a magnetic driving portion for opening and closing an opening/closing blade and locks the opening/closing blade by a lock portion, and an image pickup apparatus including the blade opening/closing apparatus.

CITATION LIST

Patent Literature

Patent Literature 1: Japanese Patent Application Laid-open No. 2005-304221

BACKGROUND ART

In various image pickup apparatuses such as a video camera and a still camera, an optical system including a lens group, an optical device, and the like therein and an image pickup device that photoelectrically converts light taken in by the optical system are provided. In such an image pickup apparatus, there is a type in which light enters an image pickup device via a focal plane shutter that functions as a blade opening/closing apparatus at a time a subject is photographed.

As the blade opening/closing apparatus, there is a type that includes a base body having an aperture formed therein, an opening/closing blade that is moved (runs) with respect to the base body, and a magnetic driving portion that causes the opening/closing blade to operate, and in the magnetic driving portion, a magnet is rotated so that the opening/closing blade is moved so as to open/close the aperture (see, for example, Patent Literature 1).

In such a blade opening/closing apparatus, the opening/closing blade is operated in a predetermined state by the magnetic driving portion in each mode. The magnetic driving portion includes a magnet, a coil, and a yoke, and the opening/closing blade is moved along with the magnet that is rotated by supply of a driving current to the coil. When no opening/closing blade (running) operation of the opening/closing blade is performed, the opening/closing blade is at an opening position where it opens the aperture or a closing position where it closes the aperture, and the opening position is set at a position where the opening/closing blade is evacuated from the aperture of the base body.

When a subject is photographed, light that has transmitted through the aperture enters an image pickup surface of an image pickup device sequentially from one side to the other side to perform exposure, and the light that has entered is sequentially photoelectrically converted by the image pickup device, to thus generate an image signal. The generated image signal is transferred to a memory, and an image of the subject is generated.

DISCLOSURE OF INVENTION

Technical Problem

Incidentally, in the blade opening/closing apparatus as described above, if a moving force is applied to the opening/closing blade due to an impact, a vibration, or the like, for example, the opening/closing blade is unintentionally moved, and it becomes difficult to secure a favorable photographing state.

In this regard, there are blade opening/closing apparatuses in which, when an opening/closing operation of the opening/closing blade is not performed, the opening/closing blade is locked at the opening position or the closing position to restrict unnecessary movements. In this case, some blade opening/closing apparatuses are configured such that, for example, a magnet is drawn to a yoke in a fixed state by a magnetic force so as to lock the opening/closing blade.

However, when the opening/closing blade is locked and thus the magnet is in a state where it is drawn to the yoke, there is a need to move the opening/closing blade while overcoming the drawing force between the yoke and the magnet at a time the opening/closing blade starts to move. Therefore, there is a possibility that a sufficient movement speed of the opening/closing blade cannot be secured depending on an energization amount with respect to the coil. In addition, a so-called appearance time that is required from the evacuated position to the aperture at the time the opening/closing blade starts to move from the opening position to the closing position also becomes long.

In this regard, in order to increase the movement speed of the opening/closing blade and shorten the appearance time, it is necessary to increase the energization amount with respect to the coil, but an increase of the energization amount leads to an increase of power consumption.

Meanwhile, there is a blade opening/closing apparatus that locks an opening/closing blade at an opening position and a closing position by a mechanical lock mechanism, but if the lock mechanism independent from a magnetic driving portion is provided, the structure becomes complicated that much and also becomes a factor that hinders miniaturization.

In this regard, a blade opening/closing apparatus and image pickup apparatus according to the present technology aim at overcoming the problems described above and securing a favorable photographing state without increasing power consumption.

Solution to Problem

Firstly, a blade opening/closing apparatus according to the present technology includes: a magnetic driving portion including a coil to which a driving current is supplied and a magnet that is rotated along with energization to the coil; a driving body that includes a to-be-locked portion and is operated by the magnetic driving portion; an opening/closing blade that opens/closes an aperture by an operation of the driving body; and a lock portion that sets a locked state of the opening/closing blade by engaging with the to-be-locked portion, the setting of the locked state and a release of the locked state being carried out in accordance with a rotation position of the magnet.

Accordingly, the lock portion engages with the to-be-locked portion to thus set the locked state and unlock the locked state in accordance with the rotation position of the magnet.

Secondly, in the blade opening/closing apparatus described above, it is desirable that the lock portion is moved between a lock position at which the locked state is set and an unlock position at which the locked state is released, in accordance with a change of a magnetic force accompanying the rotation of the magnet.

Accordingly, since the lock portion and the to-be-locked portion are operated by the magnetic driving portion, different driving portions for operating the lock portion and the to-be-locked portion are not required.

Thirdly, in the blade opening/closing apparatus described above, it is desirable that the magnetic driving portion includes a fixed yoke and a movable yoke, and the lock portion is moved between the lock position and the unlock position by an operation of the movable yoke.

Accordingly, since the movable yoke and the driving body including the to-be-locked portion are operated by energization to the coil, different driving portions for operating the movable yoke and the driving body are not required.

Fourthly, it is desirable that the blade opening/closing apparatus described above further includes a rotatable lock lever as the lock portion and a rotatable operation lever that causes the lock lever to rotate from the lock position to the unlock position, and a rotary shaft of the lock lever and a rotary shaft of the operation lever are coaxial.

Accordingly, the operation lever and the lock lever are rotated while using the same axis as a fulcrum.

Fifthly, in the blade opening/closing apparatus described above, it is desirable that a rotary shaft of the magnet and a rotary shaft of the driving body are coaxial.

Accordingly, the magnet and the driving lever are rotated while using the same rotary shaft as a fulcrum.

Sixthly, in the blade opening/closing apparatus described above, it is desirable that the driving body is fixed to the magnet.

Accordingly, the magnet and the driving body rotate integrally while using the same rotary shaft as a fulcrum.

Seventhly, in the blade opening/closing apparatus described above, it is desirable that the opening/closing blade is moved between an opening position at which the aperture is opened and a closing position at which the aperture is closed, and the locked state is set at each of the opening position and the closing position.

Accordingly, the opening/closing blade is locked at two positions, that is, the opening position and the closing position, by a single mechanism including the lock portion and the to-be-locked portion.

Eighthly, in the blade opening/closing apparatus described above, it is desirable that the to-be-locked portion includes a first engagement portion that engages with the lock portion at the opening position and a second engagement portion that engages with the lock portion at the closing position.

Accordingly, two engagement portions for locking at the two positions are formed in the to-be-locked portion.

Ninthly, in the blade opening/closing apparatus described above, it is desirable that the driving body includes a driving lever coupled to the opening/closing blade, and the driving lever includes the to-be-locked portion.

Accordingly, the driving lever includes two functions, that is, a function of causing the opening/closing blade to operate and a function of being locked.

Tenthly, in the blade opening/closing apparatus described above, it is desirable that the driving lever includes an engagement piece portion that functions as the to-be-locked portion, and both ends of the engagement piece portion are respectively formed as the first engagement portion and the second engagement portion.

Accordingly, the lock portions respectively engage with the both ends of the engagement piece portion to be locked at the two positions.

Eleventhly, it is desirable that the blade opening/closing apparatus described above further includes a power assist spring that applies a bias force to the driving body in an operation direction of the driving body.

Accordingly, a torque in a predetermined rotation direction is applied to the driving body and the magnet by the power assist spring.

Twelfthly, it is desirable that the blade opening/closing apparatus described above further includes an actuator that causes the lock portion to operate.

Accordingly, the lock lever is operated by the actuator, and the driving body including the to-be-locked portion is operated by the magnetic driving unit.

Thirteenthly, it is desirable that the blade opening/closing apparatus described above further includes a magnetic circuit portion that generates a driving force to be applied to the lock portion by energization to the coil.

Accordingly, the lock lever is operated by the magnetic circuit portion, the driving body including the to-be-locked portion is operated by the magnetic driving portion, and the driving force generated in the magnetic circuit portion and the driving force generated in the magnetic driving portion are generated by energization to the same coil.

Fourteenthly, in the blade opening/closing apparatus described above, it is desirable that two opening/closing blades are provided and operated in a direction in which the opening/closing blades are set apart from each other, and two magnetic driving portions, driving bodies, and lock portions are provided while being arranged symmetrically in correspondence with the two opening/closing blades.

Accordingly, an operation of one of the opening/closing blades is controlled by one of the magnetic driving portions, one of the driving bodies, and one of the lock levers, and an operation of the other one of the opening/closing blades is controlled by the other one of the magnetic driving portions, the other one of the driving bodies, and the other one of the lock levers.

An image pickup apparatus according to the present technology includes: a blade opening/closing apparatus that controls light taken in inside via an optical system; and an image pickup device that photoelectrically converts the light taken in via the optical system, the blade opening/closing apparatus including a magnetic driving portion including a coil to which a driving current is supplied and a magnet that is rotated along with energization to the coil, a driving body that includes a to-be-locked portion and is operated by the magnetic driving portion, an opening/closing blade that opens/closes an aperture by an operation of the driving body, and a lock portion that sets a locked state of the opening/closing blade by engaging with the to-be-locked portion, the setting of the locked state and a release of the locked state being carried out in accordance with a rotation position of the magnet.

Accordingly, in the blade opening/closing apparatus, the lock portion engages with the to-be-locked portion to set the locked state and unlock the locked state in accordance with the rotation position of the magnet.

Advantageous Effects of Invention

According to the present technology, since the lock portion engages with the to-be-locked portion to thus set the locked state and unlock the locked state in accordance with the rotation position of the magnet and locking with respect to the opening/closing blade is not performed by a magnetic force of the magnet, a favorable photographing state can be secured without causing an increase of power consumption.

It should be noted that the effects described in the specification are mere examples and should not be limited, and other effects may also be obtained.

MODES FOR CARRYING OUT THE INVENTION

Hereinafter, modes for embodying the present technology will be described with reference to the attached drawings.

In embodiments to be described below, an image pickup apparatus according to the present technology is applied to a still camera, and a blade opening/closing apparatus according to the present technology is applied to a focal plane shutter provided in this still camera.

It should be noted that an application range of the present technology is not limited to the still camera and the focal plane shutter provided in the still camera, and the present technology is widely applicable to various image pickup apparatuses incorporated in video cameras and other apparatuses and various blade opening/closing apparatuses provided in these image pickup apparatuses, such as an iris.

In descriptions below, front and back, upper and lower, and right- and left-hand directions will be indicated by directions viewed from a photographer during photographing using a still camera. Therefore, a subject side becomes the front side, and a photographer side becomes the rear side.

It should be noted that the front and back, upper and lower, and right- and left-hand directions indicated below are used for convenience of explanation, and the directions are not limited to these directions regarding implementation of the present technology.

Further, a lens group to be described below may include, in addition to a lens group including one or a plurality of lenses, a lens group including these one or a plurality of lenses and other optical devices such as an iris.

<Schematic Configuration of Image Pickup Apparatus>

First, a schematic configuration of the image pickup apparatus will be described (see FIGS. 1 to 3).

Figure 1:
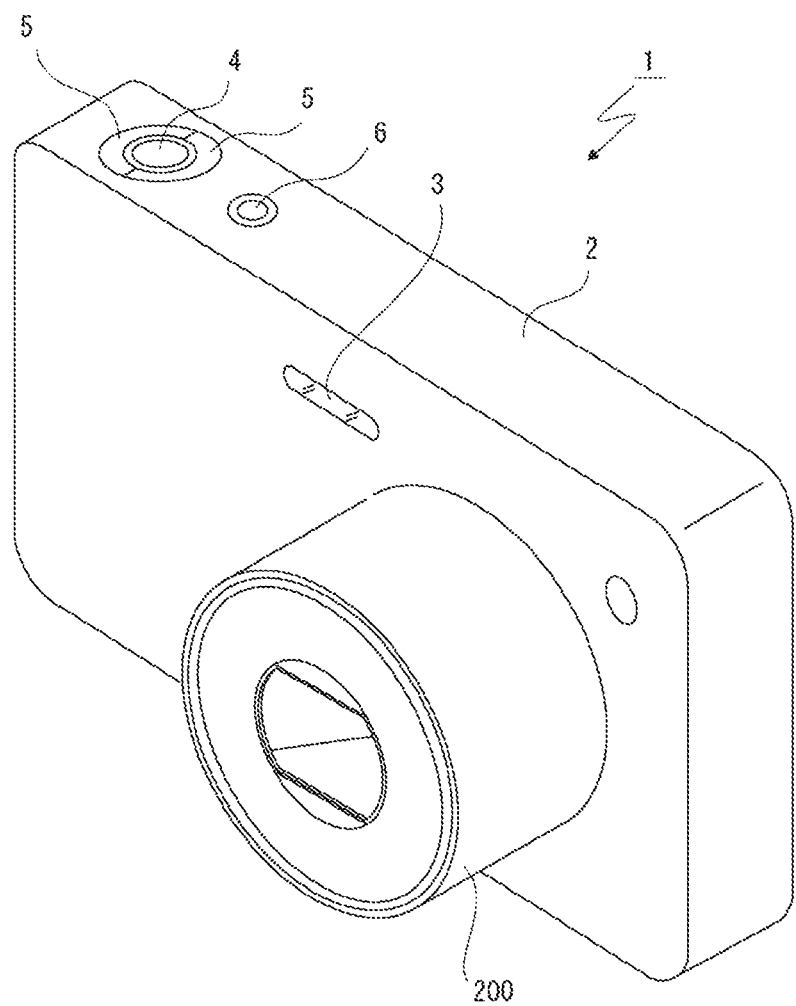
FIG. 1 A perspective view showing an embodiment of a blade opening/closing apparatus and image pickup apparatus according to the present technology together with FIGS. 2 to 30, and this view shows the image pickup apparatus.
Figure 2:
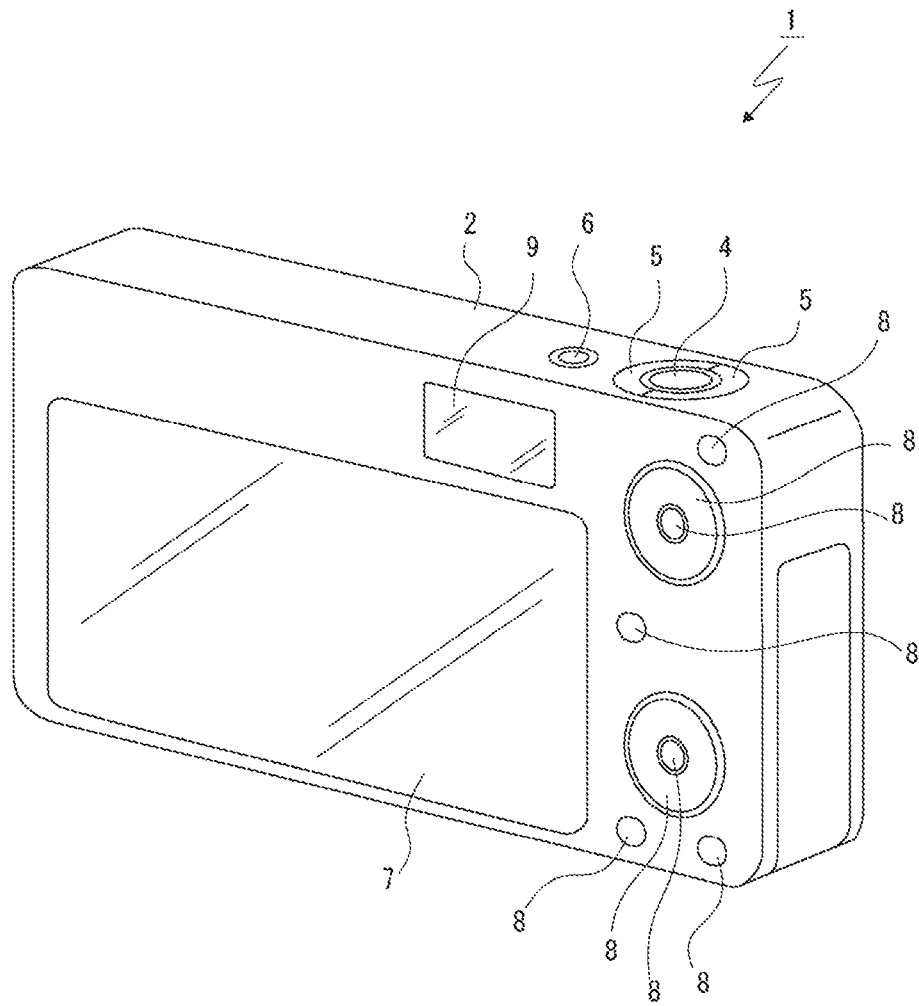
FIG. 2 A perspective view showing the image pickup apparatus viewed from a direction different from that of FIG. 1.

As shown in FIGS. 1 and 2, in an image pickup apparatus 1, for example, required portions are provided inside and outside a horizontally-long flat casing 2. As shown in FIG. 1, the image pickup apparatus 1 may be an apparatus to/from which an interchangeable lens 200 can be attached/detached.

A flash 3 is provided on a front surface of the casing 2. A shutter button 4, a zoom switch 5, and a power button 6 are provided on an upper surface of the casing 2 (see FIGS. 1 and 2). A display 7, various operation portions 8, 8, . . . , and a finder 9 are provided on a rear surface of the casing 2.

Figure 3:
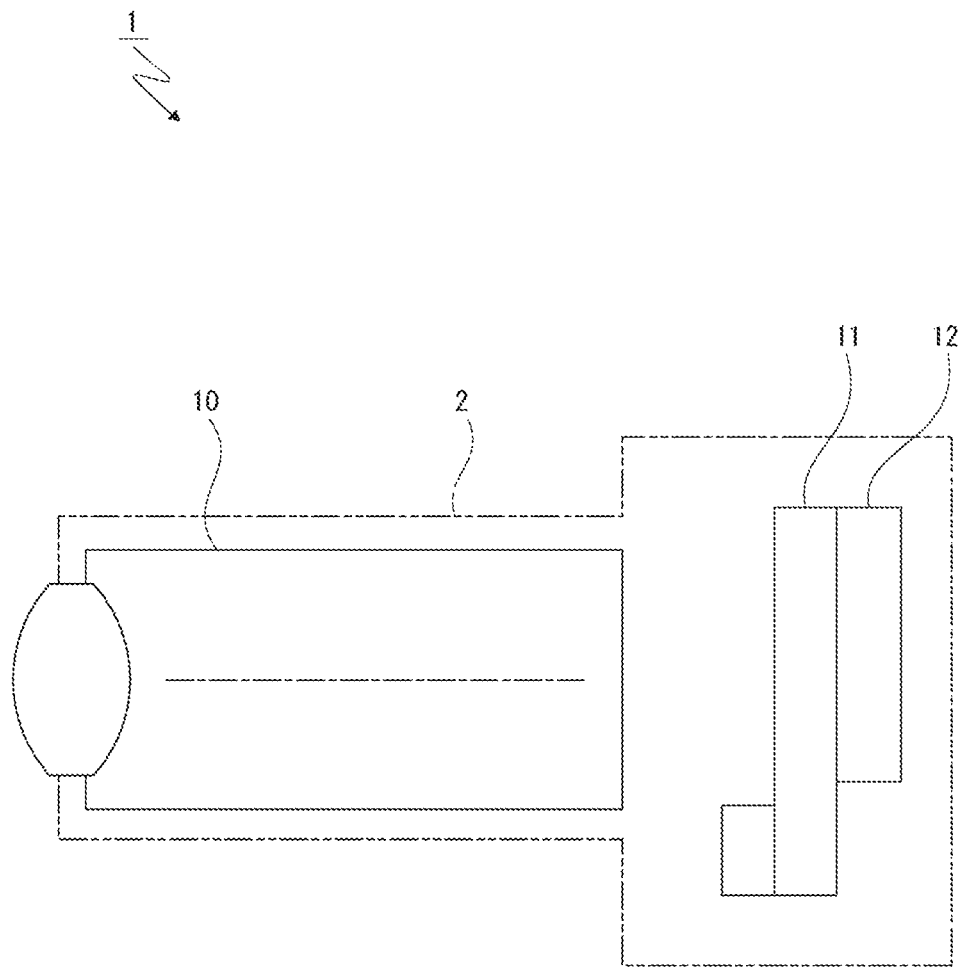
FIG. 3 A schematic side view of the image pickup apparatus.

As shown in FIG. 3, inside the casing 2, an optical system 10 including a lens group, an optical device, and the like, a blade opening/closing apparatus (focal plane shutter) 11 that controls an amount of light taken in by the optical system 10, and an image pickup device 12 that photoelectrically converts the light taken in via the blade opening/closing apparatus 11 are arranged sequentially from the front side.

<Configuration of Blade Opening/Closing Apparatus>

Hereinafter, a configuration of the blade opening/closing apparatus 11 will be described (see FIGS. 4 to 8).

The blade opening/closing apparatus 11 includes a base body 13, a presser plate 14, an accommodation case 15, a first magnetic driving portion 16, a second magnetic driving portion 17, a presser cover 18, a first opening/closing blade 19, a second opening/closing blade 20, a first link 21, and a second link 22, and is arranged on the front side of the image pickup device 12.

Figure 4:
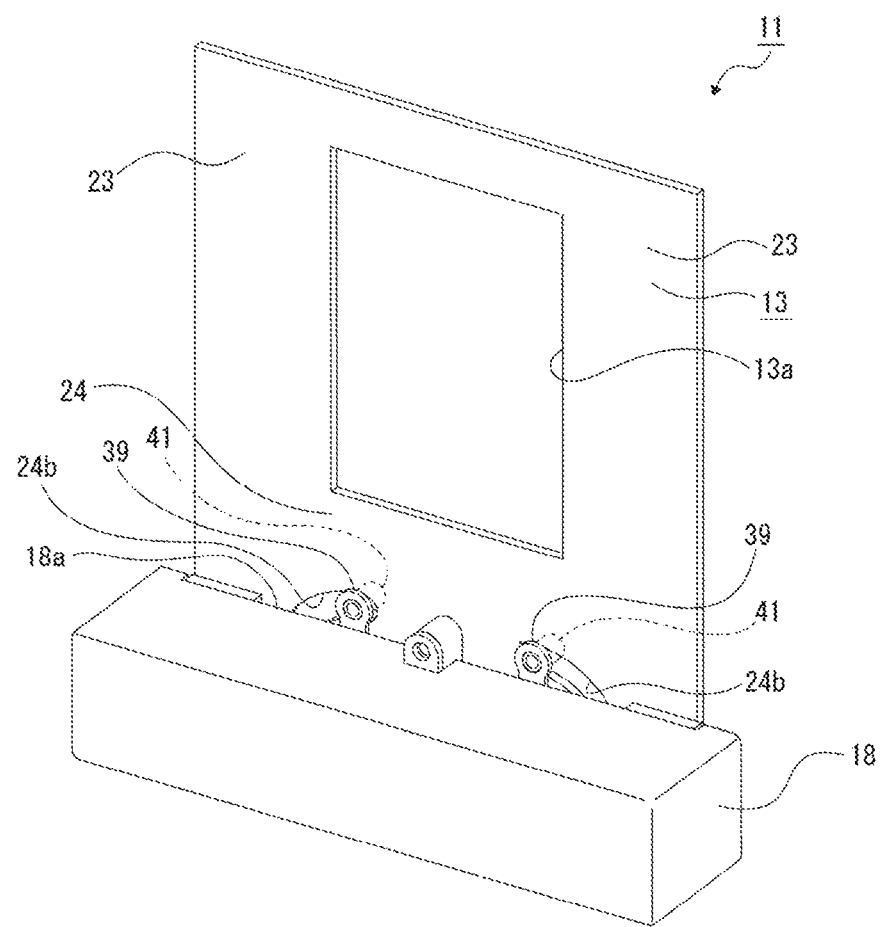
FIG. 4 A perspective view of the blade opening/closing apparatus.
Figure 5:
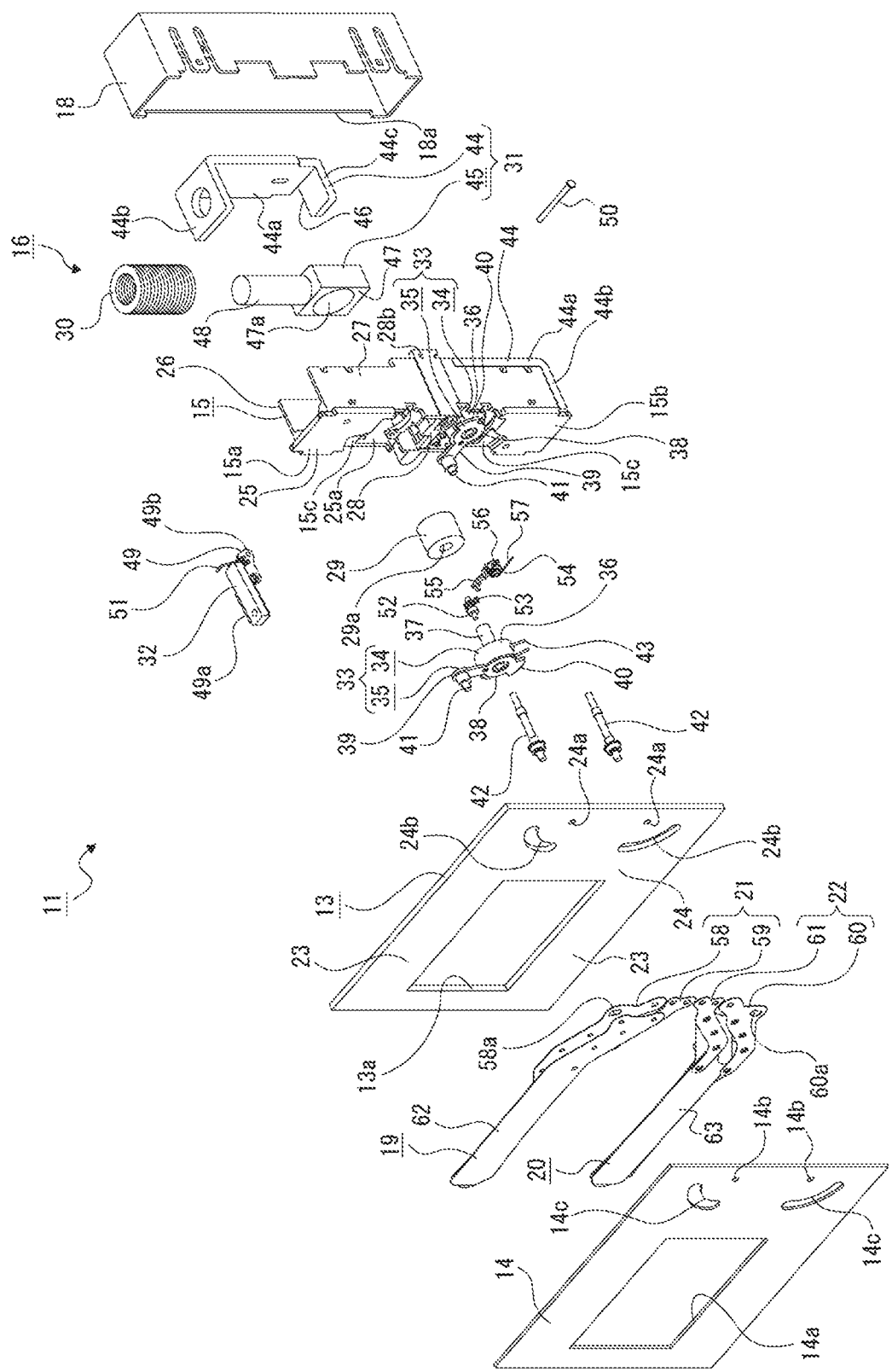
FIG. 5 An exploded perspective view of the blade opening/closing apparatus.

The base body 13 is formed in a rectangular shape, for example, and includes a rectangular aperture 13a penetrating in a front-back direction (see FIGS. 4 and 5). The aperture 13a is formed to be slightly larger than an effective incident area of light on an image pickup surface of the image pickup device 12. The effective incident area of light on the image pickup surface is an area where light that has been taken in by the optical system 10 and is requisite for generating an image enters.

Parts of the base body 13 on left- and right-hand sides of the aperture 13a are respectively provided as holding portions 23, 23 that become holding areas where the first opening/closing blade 19 and the second opening/closing blade 20 are held at an opening position, and a part of the base body 13 below the aperture 13a is provided as an attachment portion 24 to which the accommodation case 15 is to be attached.

At a lower end portion of the attachment portion 24, shaft insertion holes 24a, 24a are formed while being set apart from each other on the left- and right-hand sides. Shaft movement holes 24b, 24b are formed in the attachment portion 24 while being set apart from each other on the left- and right-hand sides, and the shaft movement holes 24b, 24b are respectively formed in an arc shape with the shaft insertion holes 24a, 24a being fulcrums.

The presser plate 14 is formed to have substantially the same size and shape as the base body 13 and includes a transmission hole 14a. The presser plate 14 is attached to the base body 13 from the rear side while sandwiching the first opening/closing blade 19 and the second opening/closing blade 20. The image pickup device 12 is arranged on the rear side of the presser plate 14. In a state where the presser plate 14 is attached to the base body 13, the transmission hole 14a is positioned right behind the aperture 13a.

Pin attachment holes 14b, 14b are formed at a lower end portion of the presser plate 14 while being set apart from each other on the left- and right-hand sides. Relief holes 14c, 14c are formed on the presser plate 14 while being set apart from each other on the left- and right-hand sides, and the relief holes 14c, 14c are respectively formed in an arc shape with the pin attachment holes 14b, 14b being fulcrums.

The accommodation case 15 is formed of a nonmagnetic material such as a resin material and includes a rear surface portion 25, an upper surface portion 26, a lower surface portion 27, and a partition portion 28.

A rear end portion of the upper surface portion 26 is continuous with an upper end portion of the rear surface portion 25, and a lower end portion or rear-end-side portion of the lower surface portion 27 is continuous with a lower end portion of the rear surface portion 25. The partition portion 28 faces the lateral direction, a portion thereof close to the rear end is continuous with a center portion of the rear surface portion 25 in the lateral direction, and upper and lower end portions thereof are respectively connected to the upper surface portion 26 and the lower surface portion 27.

The accommodation case 15 is equally partitioned on the left- and right-hand sides by the partition portion 28 and is formed to be symmetric on the left- and right-hand sides while using the partition portion 28 as a reference. Left- and right-hand portions of the accommodation case 15 partitioned by the partition portion 28 are provided as a first arrangement portion 15a and a second arrangement portion 15b, respectively.

It should be noted that in the blade opening/closing apparatus 11, the accommodation case 15 is formed to be symmetric on the left- and right-hand sides, and two magnetic driving portions to be described later, that are to be arranged in the first arrangement portion 15a and the second arrangement portion 15b, are also formed to be symmetric on the left- and right-hand sides. Therefore, a configuration on the first arrangement portion 15a side will mainly be described below, and a configuration on the second arrangement portion 15b side will be described as necessary.

A part of the rear surface portion 25 is positioned more on the front side than a rear surface of the lower surface portion 27 and a rear surface of the partition portion 28. Since a part of the rear surface portion 25 is positioned more on the front side than the rear surface of the lower surface portion 27 and the rear surface of the partition portion 28 in this way, an arrangement concave portion 15c that is opened rearwardly and upwardly is formed in the accommodation case 15.

An insertion hole 25a penetrating in the front-back direction is formed in the rear surface portion 25, and the insertion hole 25a is in communication with the first arrangement portion 15a. In the rear surface portion 25, a first attachment hole 25b and a second attachment hole 25c are formed at positions near the insertion hole 25a while being set apart from each other in the longitudinal direction.

A first spring support surface 27a and a second spring support surface 27b that face opposing directions are formed on a lower side of the arrangement concave portion 15c in the lower surface portion 27 while being set apart from each other in the lateral direction.

A part of a surface of the partition portion 28 that forms the arrangement concave portion 15c is a spring reception surface 28a. At a front end portion of the partition portion 28, a shaft insertion hole 28b that penetrates longitudinally is formed.

The accommodation case 15 is attached to the attachment portion 24 of the base body 13 from the front side. In a state where the accommodation case 15 is attached to the attachment portion 24, the insertion holes 25a, 25a of the accommodation case 15 are respectively positioned in front of the shaft insertion holes 24a, 24a of the base body 13.

Figure 6:
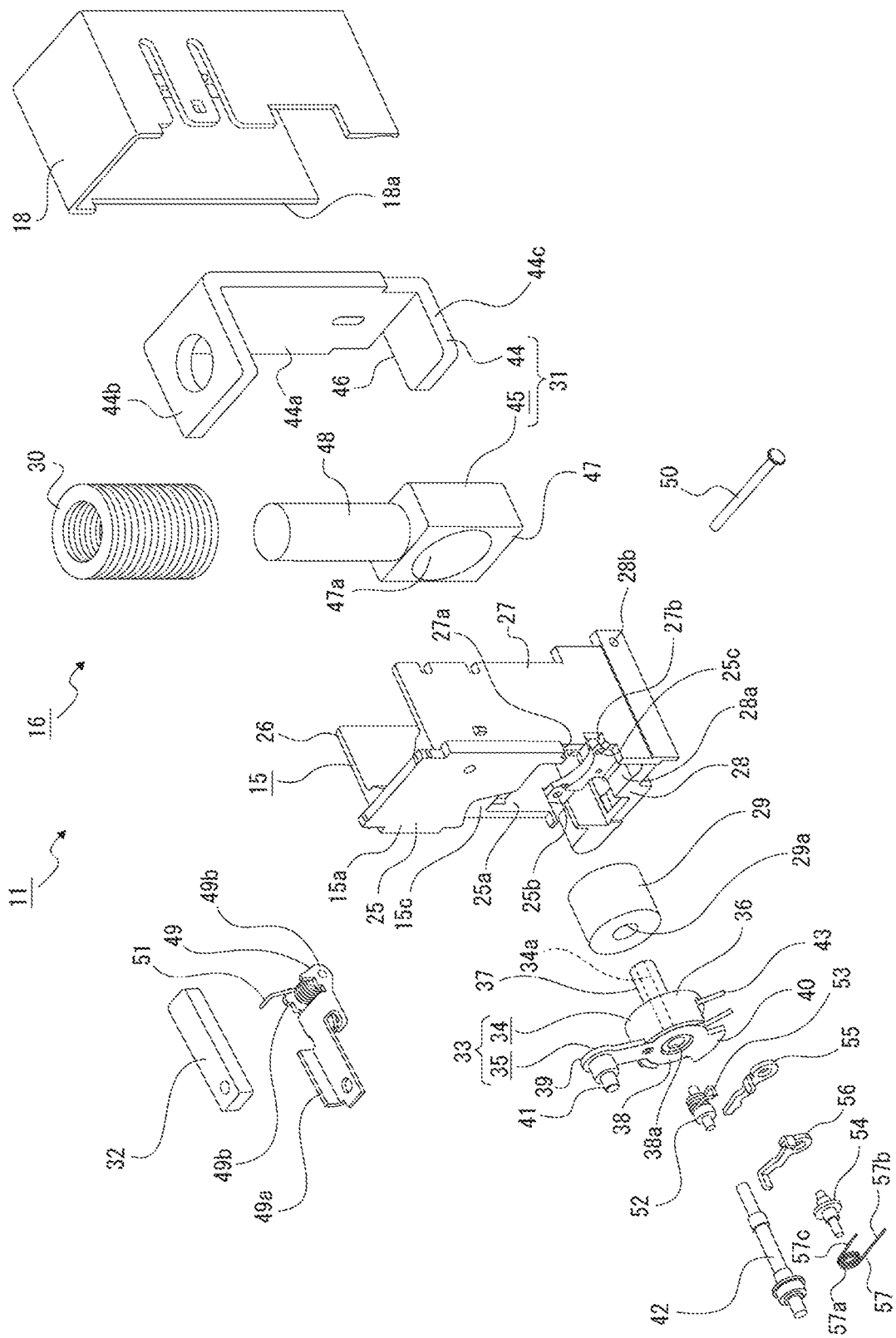
FIG. 6 An exploded perspective view showing half the blade opening/closing apparatus on one side.
Figure 7:
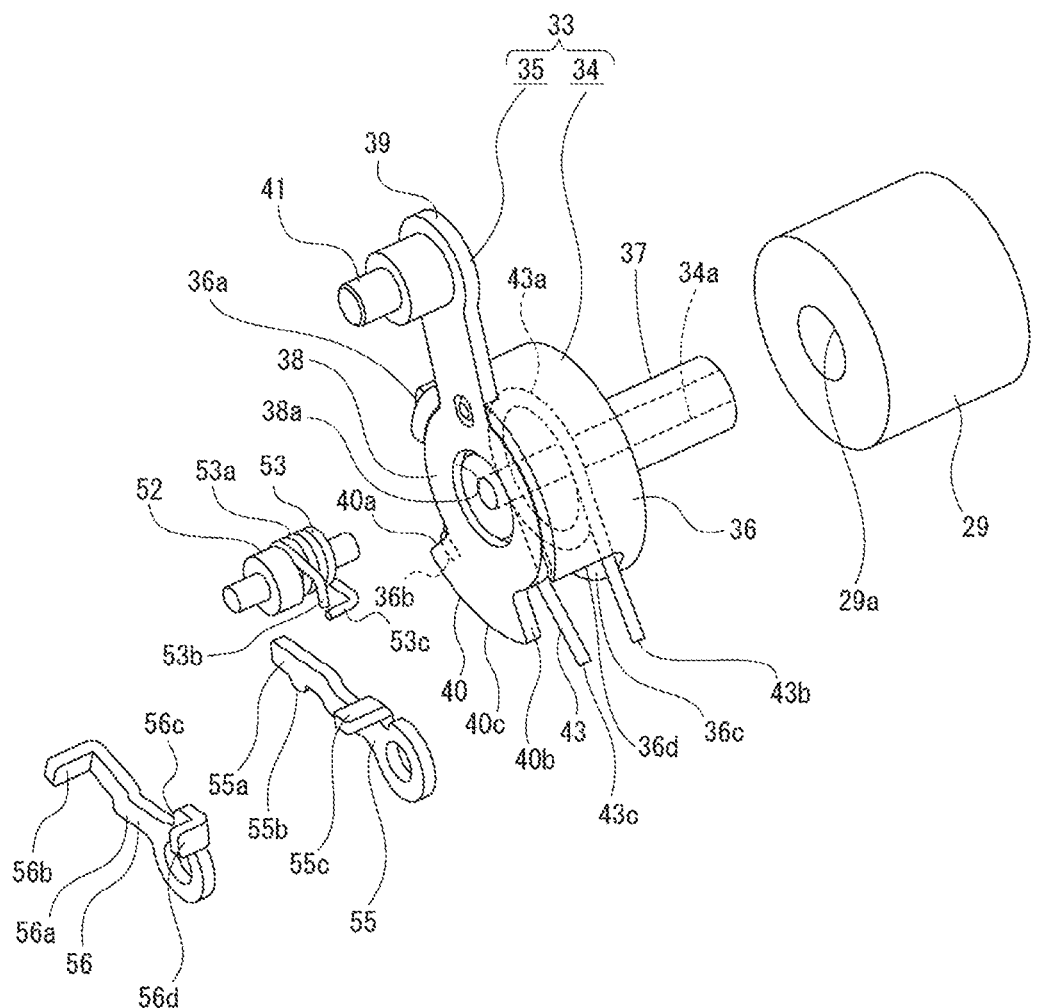
FIG. 7 An enlarged exploded perspective view showing a part of the blade opening/closing apparatus.
Figure 8:
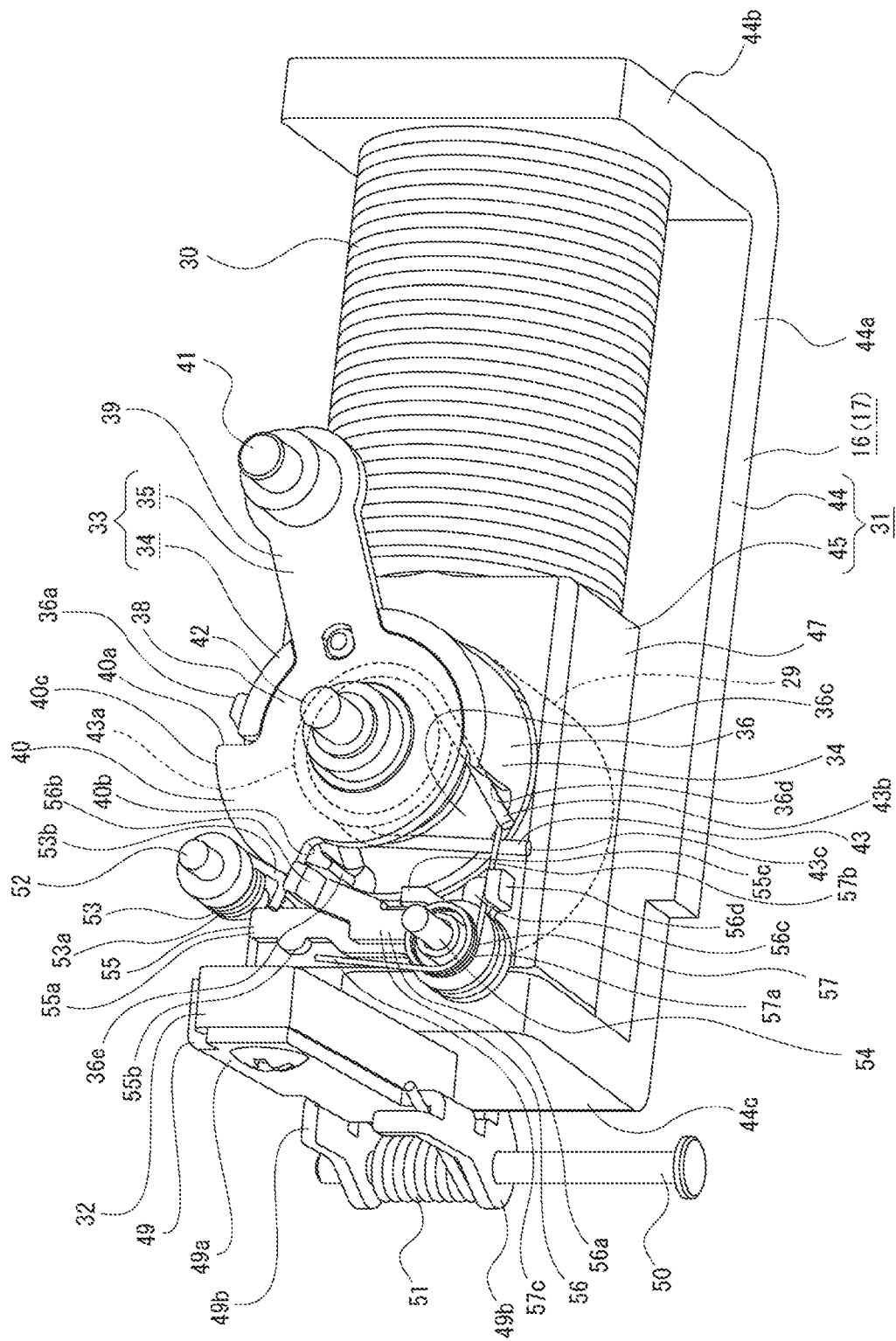
FIG. 8 An enlarged perspective view showing a part of the blade opening/closing apparatus.

The first magnetic driving portion 16 includes a magnet 29, a coil 30, a fixed yoke 31, and a movable yoke 32 and is arranged in the first arrangement portion 15a of the accommodation case 15 (see FIGS. 5 to 7).

The magnet 29 is formed in a cylindrical shape in which an axial direction is set in the front-back direction and is, for example, two-pole magnetized. The magnet 29 is fixed to a driving body 33.

The driving body 33 is formed by coupling a base member 34 and a driving lever 35.

The base member 34 is constituted of a lever holding portion 36 and an insertion shaft portion 37, and the insertion shaft portion 37 protrudes forwardly from a center portion of the lever holding portion 36.

An outer shape of the lever holding portion 36 is formed in a circular shape having substantially the same diameter as the magnet 29. On an outer circumferential surface of the lever holding portion 36, a first operation protrusion portion 36a and a second operation protrusion portion 36b are provided while being set apart from each other in a circumferential direction. A spring arrangement concave portion 36c that is opened rearwardly and sideways is formed in the lever holding portion 36. In the lever holding portion 36, wall surfaces that form the spring arrangement concave portion 36c and are set apart from each other in the circumferential direction are formed as a first spring restriction wall 36d and a second spring restriction wall 36e, respectively.

In the base member 34, a shaft insertion hole 34a that penetrates a center portion is formed.

The driving lever 35 is formed by integrally forming a coupling plate portion 38 formed in an annular shape, an arm plate portion 39 that protrudes from the coupling plate portion 38 in a radial direction, and an engagement piece portion 40 that protrudes from the coupling plate portion 38 in a radial direction different from that of the arm plate portion 39.

The coupling plate portion 38 is coupled to a rear end portion of the lever holding portion 36 in the base member 34. A coupling shaft 41 is attached to a tip end portion of the arm plate portion 39, and the coupling shaft 41 protrudes rearwardly from the arm plate portion 39. The engagement piece portion 40 is formed to have a substantially arc surface, and side edges on both sides in the circumferential direction are formed as a first engagement portion 40a and a second engagement portion 40b, respectively. An outer circumferential edge between the first engagement portion 40a and the second engagement portion 40b is formed as a sliding portion 40c. The engagement piece portion 40 functions as a to-be-locked portion.

The driving lever 35 is held by the coupling plate portion 38 being attached to the lever holding portion 36 of the base member 34, and the arm plate portion 39 and the engagement piece portion 40 protrude outwardly from an outer circumference of the lever holding portion 36.

In the driving body 33, the insertion shaft portion 37 of the base member 34 is inserted into a center portion of the magnet 29 from the rear to be fixed to the magnet 29. In a state where the driving body 33 is fixed to the magnet 29, the magnet 29 is inserted into the insertion hole 25a of the rear surface portion 25 and arranged in the accommodation case 15. In the driving body 33, the lever holding portion 36 is arranged in the arrangement concave portion 15c, and the arm plate portion 39 of the driving lever 35 protrudes outwardly from the accommodation case 15.

A rotary shaft 42 is inserted into a center hole 38a of the coupling plate portion 38, the shaft insertion hole 34a of the base member 34, and a center hole 29a of the magnet 29, and thus the magnet 29 and the driving body 33 become integrally rotatable using the rotary shaft 42 as a fulcrum. A front end portion of the rotary shaft 42 is fixed to the accommodation case 15, and a rear end portion thereof is inserted into the shaft insertion hole 24a of the base body 13, one end portion of the first link 21 or the second link 22, and a pin attachment hole 14b of the presser plate 14.

A power assist spring 43 is supported by the rotary shaft 42. The power assist spring 43 is, for example, a torsion coil spring, and is constituted of a coil portion 43a, a first arm portion 43b, and a second arm portion 43c. The power assist spring 43 is arranged in the spring arrangement concave portion 36c formed in the lever holding portion 36 of the base member 34 on the front side of the coupling plate portion 38 in a state where the coil portion 43a is supported by the rotary shaft 42. In the power assist spring 43, the first arm portion 43b and the second arm portion 43c protrude from the lever holding portion 36, and the power assist spring 43 is capable of engaging with the first spring support surface 27a and the second spring support surface 27b formed on the lower surface portion 27 of the accommodation case 15.

The coupling shaft 41 attached to the arm plate portion 39 of the driving lever 35 is inserted into the shaft movement hole 24b of the base body 13, a part close to one end of the first link 21 or the second link 22, and the relief hole 14c of the presser plate 14.

The fixed yoke 31 is constituted of a U-shaped flat plate yoke portion 44 that opens rearwardly and a coupling yoke portion 45 coupled to the flat plate yoke portion 44.

The flat plate yoke portion 44 is constituted of a base surface portion 44a extending in the lateral direction and opposing surface portions 44b and 44c that respectively protrude rearwardly from left- and right-hand side edges of the base surface portion 44a. The opposing surface portion 44c is smaller in size than the opposing surface portion 44b and is formed in a shape that includes a notch 46 on an upper end side thereof.

The coupling yoke portion 45 is constituted of a block-shaped magnet arrangement portion 47 and a shaft-like portion 48 that protrudes laterally from the magnet arrangement portion 47, and an arrangement hole 47a that penetrates in the front-back direction is formed in the magnet arrangement portion 47. The shaft-like portion 48 is inserted into the coil 30, and the coil 30 is held by the shaft-like portion 48. In the coupling yoke portion 45, a tip end portion of the shaft portion 48 and one end surface of the magnet arrangement portion 47 are respectively attached to the opposing surface portions 44b and 44c, to thus be coupled to the flat plate yoke portion 44.

The fixed yoke 31 is attached to the accommodation case 15 while holding the coil 30. In a state where the fixed yoke 31 is attached to the accommodation case 15, the coupling yoke portion 45 and the coil 30 are positioned between the rear surface portion 25 and the base surface portion 44a of the flat plate yoke portion 44.

The second magnetic driving portion 17 is arranged in the second arrangement portion 15b of the accommodation case 15. Since the second magnetic driving portion 17 has the same configuration as the first magnetic driving portion 16 and is symmetric on left- and right-hand sides, descriptions on the second magnetic driving portion 17 will be omitted.

In this way, the first magnetic driving portion 16 or the second magnetic driving portion 17, the driving bodies 33, 33, and lock levers 56, 56 functioning as a lock portion are respectively provided two each while being symmetric in correspondence with the first opening/closing blade 19 and the second opening/closing blade 20.

Therefore, an operation of the first opening/closing blade 19 is controlled by the first magnetic driving portion 16, the one of the driving bodies 33, and one of the lock levers 56, and an operation of the second opening/closing blade 20 is controlled by the second magnetic driving portion 17, the other one of the driving bodies 33, and the other one of the lock levers 56. Accordingly, the first opening/closing blade 19 and the second opening/closing blade 20 can respectively be operated appropriately with a simple configuration.

The movable yoke 32 is rotatable with respect to the accommodation case 15 while being held by a bracket 49.

The bracket 49 is rotatable with respect to the accommodation case 15 with a support shaft 50 inserted into the shaft insertion hole 28b of the accommodation case 15 being a fulcrum. The bracket 49 includes a yoke holding portion 49a and supported shaft portions 49b, 49b that protrude from the yoke holding portion 49a, and the supported shaft portions 49b, 49b are supported by the support shaft 50. On the support shaft 50, for example, a return spring 51 as a torsion coil spring is supported between the supported shaft portions 49b, 49b.

The bracket 49 and the movable yoke 32 held by the bracket 49 are biased by the return spring 51 in a direction in which they approach the magnet 29.

The movable yoke 32 is held by being attached to the yoke holding portion 49a of the bracket 49. The movable yoke 32 is positioned at the notch 46 formed in the fixed yoke 31 attached to the accommodation case 15. Therefore, the movable yoke 32 is influenced by a magnetic flux generated in a magnetic circuit constituted of the magnet 29, the coil 30, and the fixed yoke 31. The movable yoke 32 is biased in the direction in which it approaches the magnet 29 by the return spring 51 while being positioned at the notch 46.

A spring support shaft 52 is attached to the first attachment hole 25b formed in the rear surface portion 25 of the accommodation case 15. A bias spring 53 is supported by the spring support shaft 52. The bias spring 53 is, for example, a torsion coil spring, and is constituted of a coil portion 53a, a first arm portion 53b, and a second arm portion 53c. In a state where the coil portion 53a of the bias spring 53 is supported by the spring support shaft 52, the first arm portion 53b is capable of engaging with the outer circumferential surface of the lever holding portion 36 in the driving body 33, and the second arm portion 53c is capable of engaging with an operation lever to be described later.

A lever support shaft 54 is attached to the second attachment hole 25c formed in the rear surface portion 25 of the accommodation case 15. Each of an operation lever 55 and the lock lever 56 is rotatably supported by the lever support shaft 54.

The operation lever 55 is positioned in front of the lock lever 56 and includes a main body portion 55a extending substantially in the longitudinal direction, a pressing protrusion portion 55b that protrudes sideways from one end portion of the main body portion 55a, and a presser protrusion portion 55c that protrudes rearwardly from a position close to the other end of the main body portion 55a. The other end portion of the main body portion 55a of the operation lever 55 is supported by the lever support shaft 54.

In the operation lever 55, the pressing protrusion portion 55b opposes the movable yoke 32, and the second arm portion 53c of the bias spring 53 is capable of being brought into contact with a tip end portion of the main body portion 55a.

The lock lever 56 functions as a lock portion that locks the first opening/closing blade 19 and the second opening/closing blade 20 at the opening position or the closing position. The lock lever 56 includes an extension portion 56a extending substantially in the longitudinal direction, a lock protrusion portion 56b that protrudes rearwardly from one end portion of the extension portion 56a, an orthogonal portion 56c that is continuous with the other end portion of the extension portion 56a and is bent in a direction substantially orthogonal to the extension portion 56a, and a spring reception protrusion portion 56d that protrudes rearwardly from a tip end portion of the orthogonal portion 56c. The other end portion of the extension portion 56a of the lock lever 56 is supported by the lever support shaft 54.

The extension portion 56a of the lock lever 56 is in a state where it is capable of engaging with the presser protrusion portion 55c of the operation lever 55 from the driving body 33 side.

A lock spring 57 is supported by the lever support shaft 54. The lock spring 57 is, for example, a torsion coil spring, and is constituted of a coil portion 57a, a first arm portion 57b, and a second arm portion 57c. In the lock spring 57, in a state where the coil portion 57a is supported by the lever support shaft 54, the first arm portion 57b engages with the spring reception protrusion portion 56d of the lock lever 56, and the second arm portion 57c engages with the spring reception surface 28a formed in the partition portion 28 of the accommodation case 15.

Therefore, the lock lever 56 is biased by the lock spring 57 in a direction in which the extension portion 56a approaches the driving body 33.

In a state where the first magnetic driving portion 16 and the second magnetic driving portion 17 are arranged while being accommodated in the accommodation case 15 as described above, the opposing surface portions 44b and 44c of the fixed yoke 31 of the first magnetic driving portion 16 and the opposing surface portions 44b and 44c of the fixed yoke 31 of the second magnetic driving portion 17 are arranged while facing the same direction.

Therefore, since the opposing surface portions 44b and 44c of the first magnetic driving portion 16 and the opposing surface portions 44b and 44c of the second magnetic driving portion 17 are aligned in a thickness direction, the blade opening/closing apparatus 11 can be miniaturized.

Further, in the blade opening/closing apparatus 11, the accommodation case 15 that is to be attached to the base body 13 is provided, and the first magnetic driving portion 16 and the second magnetic driving portion 17 are accommodated in the accommodation case 15.

Therefore, members for respectively accommodating the first magnetic driving portion 16 and the second magnetic driving portion 17 become unnecessary, and the number of components can be reduced. In addition, since both the first magnetic driving portion 16 and the second magnetic driving portion 17 are accommodated in the accommodation case 15, the first magnetic driving portion 16 and the second magnetic driving portion 17 can be arranged close to each other, to thus further miniaturize the blade opening/closing apparatus 11.

In a state where the first magnetic driving portion 16 and the second magnetic driving portion 17 are accommodated in the accommodation case 15 as described above, the presser cover 18 is attached to the accommodation case 15. The presser cover 18 is formed in a laterally-long shape that is opened rearwardly, and the accommodation case 15, the first magnetic driving portion 16, and the second magnetic driving portion 17 are covered by the presser cover 18.

A notched portion 18a is formed at a rear end portion of the upper surface portion of the presser cover 18. In a state where the presser cover 18 is attached to the accommodation case 15, a tip end portion of each of the arm plate portions 39, 39 of the driving levers 35, 35 is capable of protruding in an outward direction of the presser cover 18 from the notched portion 18a (see FIG. 4).

Figure 9:
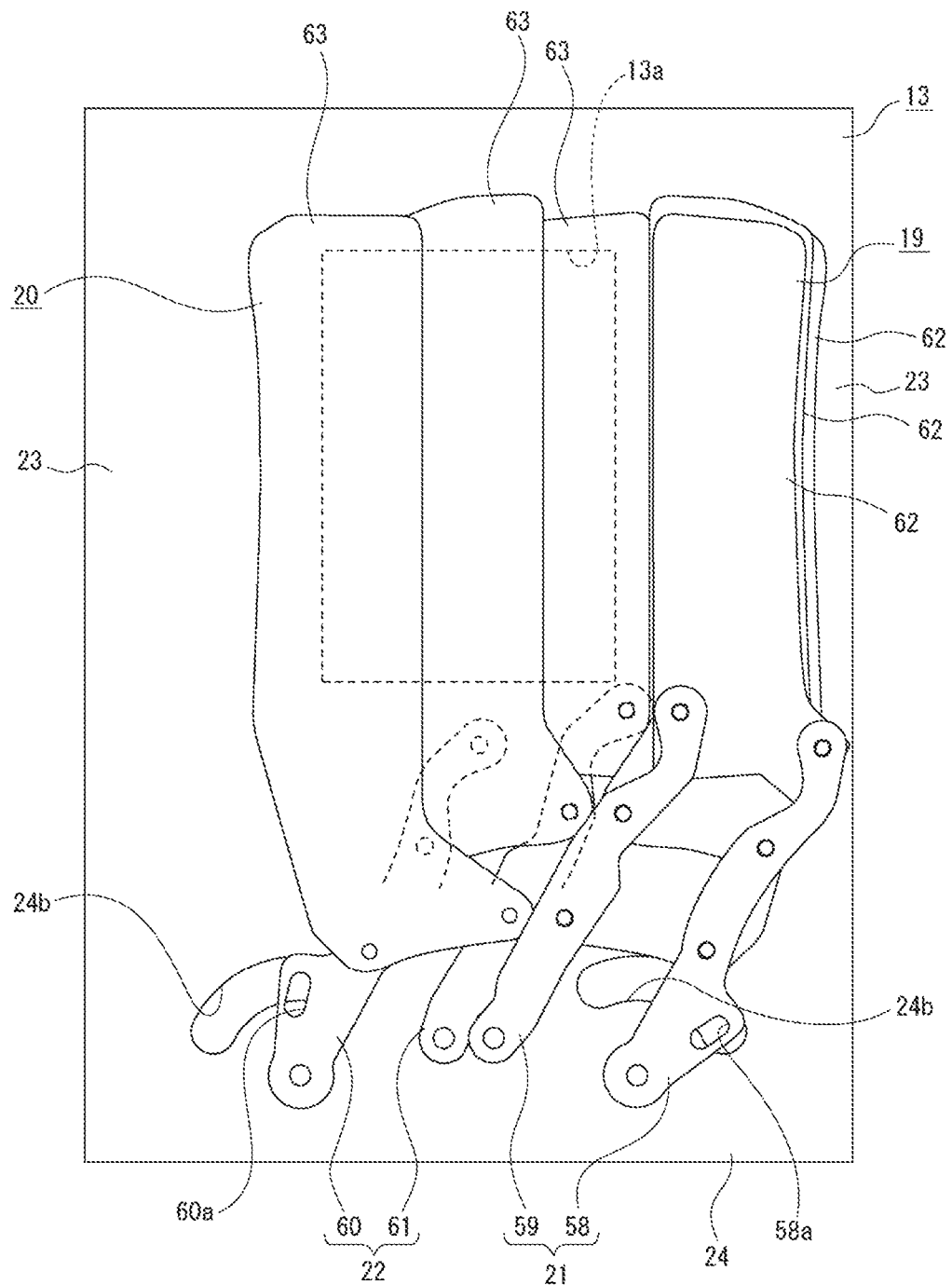
FIG. 9 A schematic front view showing a state where a first opening/closing blade is at an opening position and a second opening/closing blade is at a closing position.

The first link 21 and the second link 22 are respectively coupled to the first opening/closing blade 19 and the second opening/closing blade 20, and the first opening/closing blade 19 and the second opening/closing blade 20 are respectively coupled to the coupling shafts 41 and rotary shafts 42, 42 of the driving bodies 33, 33 via the first link 21 and the second link 22 (see FIGS. 5 and 9). The first link 21 and the second link 22 are both parallel links.

The first link 21 is constituted of first arms 58, 59 that are set apart from each other on the left- and right-hand sides, and a coupling hole 58a extending in a predetermined direction is formed at a position near a lower end of the first arm 58. The first link 21 is coupled to the driving body 33 by the coupling shaft 41 of the driving body 33 of the first magnetic driving portion 16 being slidably inserted into the coupling hole 58a of the first arm 58. A lower end portion of each of the first arms 58, 59 is rotatably coupled to the lower end portion of the base body 13. It should be noted that in the first arm 58, the rotary shaft 42 to be inserted into one of the shaft insertion holes 24a of the base body 13 is inserted into the lower end portion, and the first arm 58 is rotated using the rotary shaft 42 as a fulcrum.

The second link 22 is constituted of second arms 60, 61 that are set apart from each other on the left- and right-hand sides, and a coupling hole 60a extending in a predetermined direction is formed at a position near a lower end of the second arm 60. The second link 22 is coupled to the driving body 33 by the coupling shaft 41 of the driving body 33 of the second magnetic driving portion 17 being slidably inserted into the coupling hole 60a of the second arm 60. A lower end portion of each of the second arms 60, 61 is rotatably coupled to the lower end portion of the base body 13. It should be noted that in the second arm 60, the rotary shaft 42 to be inserted into the other one of the shaft insertion holes 24a of the base body 13 is inserted into the lower end portion, and the second arm 60 is rotated using the rotary shaft 42 as a fulcrum.

The first opening/closing blade 19 is constituted of a plurality of sheet-like first sectors 62, 62, 62. At least parts of the first sectors 62, 62, 62 overlap in the thickness direction in the first opening/closing blade 19, and the first opening/closing blade 19 is moved between the opening position at which the aperture 13a of the base body 13 is opened and the closing position at which the aperture 13a is closed.

Both end portions on the left- and right-hand sides of each of the first sectors 62, 62, 62 at the lower end portion thereof are rotatably coupled to the respective portions of the first arms 58, 59. Accordingly, when the driving body 33 is rotated, the first arms 58, 59 are moved while maintaining a parallel state due to the rotation of the driving body 33, and the first sectors 62, 62, 62 are moved substantially in the lateral direction along with the movement of the first arms 58, 59. At this time, movement amounts of the first sectors 62, 62, 62 in substantially the lateral direction differ, and thus overlapping areas vary.

The second opening/closing blade 20 is constituted of a plurality of sheet-like second sectors 63, 63, 63. At least parts of the second sectors 63, 63, 63 overlap in the thickness direction in the second opening/closing blade 20, and the second opening/closing blade 20 is moved between the opening position at which the aperture 13a of the base body 13 is opened and the closing position at which the aperture 13a is closed.

Both end portions on the left- and right-hand sides of each of the second sectors 63, 63, 63 at the lower end portion thereof are rotatably coupled to the respective portions of the second arms 60, 61. Therefore, when the driving body 33 is rotated, the second arms 60, 61 are moved while maintaining a parallel state due to the rotation of the driving body 33, and the second sectors 63, 63, 63 are moved substantially in the lateral direction along with the movement of the second arms 60, 61. At this time, movement amounts of the second sectors 63, 63, 63 in substantially the lateral direction differ, and thus overlapping areas vary.

When the first opening/closing blade 19 and the second opening/closing blade 20 are moved as described above, the overlapping areas of the first sectors 62, 62, 62 and the second sectors 63, 63, 63 vary in accordance with the positions to which the sectors are moved, and the areas become the smallest at the opening position at which the aperture 13a is opened.

Therefore, since arrangement spaces of the first opening/closing blade 19 and the second opening/closing blade 20 become small at the opening position and the areas of the first opening/closing blade 19 and the second opening/closing blade 20 become the largest at the closing position, it becomes possible to miniaturize the blade opening/closing apparatus 11 in the movement direction of the first opening/closing blade 19 and the second opening/closing blade 20 and form a sufficiently-large aperture 13a.

A first sheet (not shown) is provided between the first opening/closing blade 19 and the second opening/closing blade 20, and the first sheet prevents the first opening/closing blade 19 and the second opening/closing blade 20 from coming into contact with each other and smoothens operations of the first opening/closing blade 19 and the second opening/closing blade 20.

Further, a second sheet (not shown) is provided between the second opening/closing blade 20 and the presser plate 14, and the second sheet smoothens operations of the second opening/closing blade 20.

<Operations of Blade Opening/Closing Apparatus>

Hereinafter, a lock operation and the like in the blade opening/closing apparatus 11 will be described. It should be noted that since the lock operations regarding the first opening/closing blade 19 and the second opening/closing blade 20 are similar to each other, only the lock operation regarding the first opening/closing blade 19 will be described in detail below, and detailed descriptions of the lock operation regarding the second opening/closing blade 20 will be omitted.

First, an initial state of the first opening/closing blade 19 and the second opening/closing blade 20 will be described (see FIG. 9).

In a state before the power button 6 of the image pickup apparatus 1 is operated, the coils 30, 30 are not energized, the first opening/closing blade 19 is held at the opening position, and the second opening/closing blade 20 is held at the closing position, for example. Therefore, the aperture 13a of the base body 13 is closed by the second opening/closing blade 20.

Figure 10:
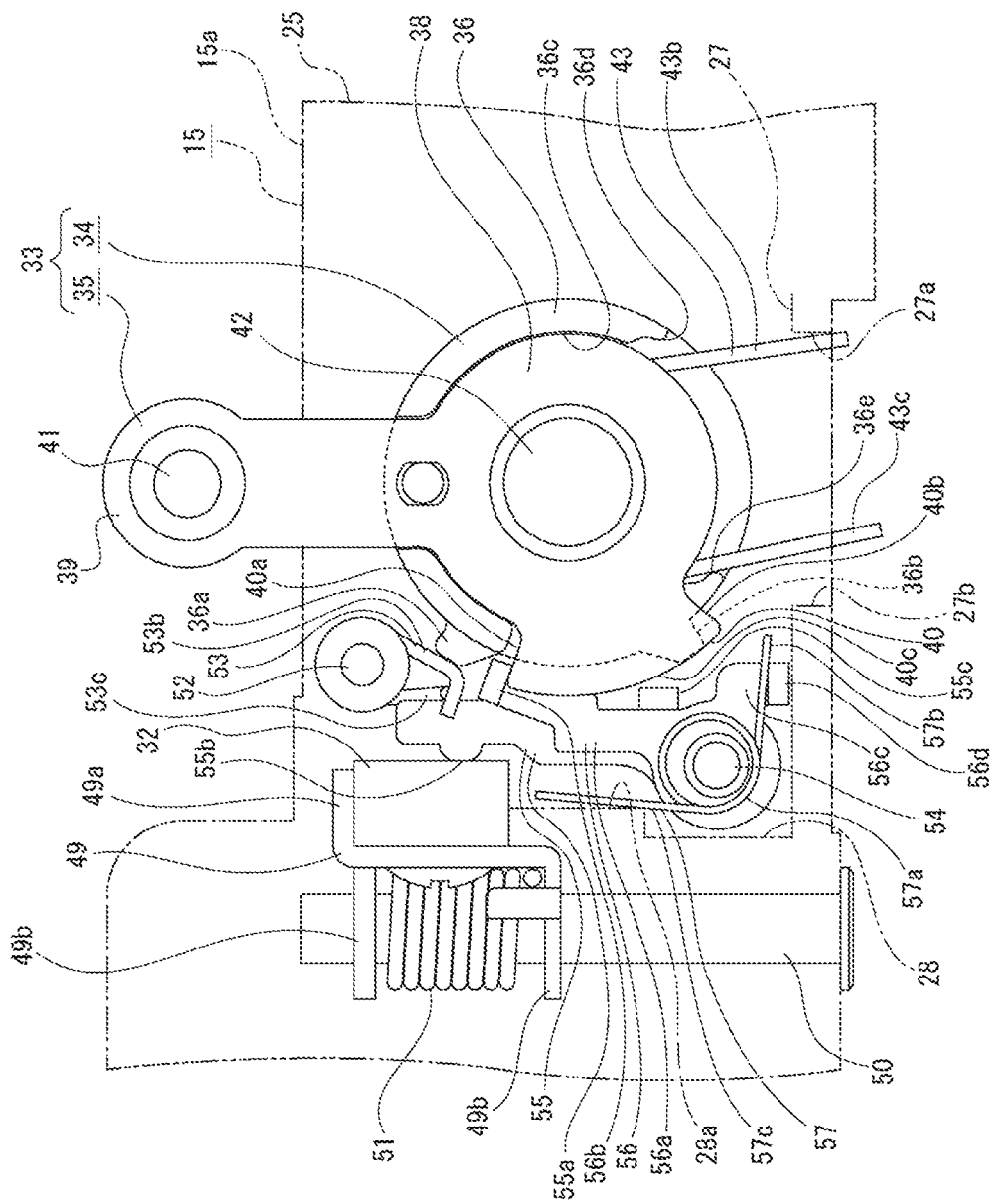
FIG. 10 A rear view showing an operation of the blade opening/closing apparatus together with FIGS. 11 to 13, and this view shows a state where a lock protrusion portion is engaged with a first engagement portion of an engagement piece portion.

At this time, the first opening/closing blade 19 is locked at the opening position as follows (see FIG. 10).

The movable yoke 32 is drawn by a magnetic force of the magnet 29 and held in a vertical state.

The first arm portion 53b of the bias spring 53 is pressed against the first operation protrusion portion 36a of the lever holding portion 36 of the driving body 33, and the second arm portion 53c is pressed against a tip end portion of the main body portion 55a of the operation lever 55. At this time, the pressing protrusion portion 55b of the operation lever 55 is pressed against the movable yoke 32.

The first arm portion 57b of the lock spring 57 engages with the spring reception protrusion portion 56d of the lock lever 56, and the second arm portion 57c engages with the spring reception surface 28a formed in the partition portion 28 of the accommodation case 15. Therefore, the lock lever 56 is biased by the lock spring 57 in a direction in which the extension portion 56a approaches the driving body 33.

The lock lever 56 is at a lock position by being biased by a bias force of the lock spring 57 in a direction in which the extension portion 56a approaches the lever holding portion 36, and the lock protrusion portion 56b engages with the first engagement portion 40a of the engagement piece portion 40 in the driving lever 35.

Since the lock protrusion portion 56b engages with the first engagement portion 40a in this way, rotations of the driving body 33 and the magnet 29 are restricted, and the first opening/closing blade 19 is locked at the opening position.

At this time, the first arm portion 43b of the power assist spring 43 engages with the first spring support surface 27a formed in the lower surface portion 27 of the accommodation case 15, and the second arm portion 43c engages with the second spring restriction wall 36e of the lever holding portion 36. Therefore, a bias force is applied to the driving body 33 by the power assist spring 43 in a direction in which the first engagement portion 40a is pressed against the lock protrusion portion 56b. At this time, the second arm portion 43c is not engaged with the second spring support surface 27b formed in the lower surface portion 27 of the accommodation case 15.

When the coil 30 is energized in a state where the first opening/closing blade 19 is locked at the opening position as described above, a rotational force is imparted to the magnet 29 by a magnetic flux generated in the first magnetic driving portion 16. At this time, since the bias force in the rotation direction is applied to the driving body 33 by the power assist spring 43, the applied bias force operates as auxiliary power with respect to the rotation of the driving body 33.

When the magnet 29 and the driving body 33 are rotated a certain angle, the first arm portion 43b of the power assist spring 43 comes into contact with the first spring restriction wall 36d of the lever holding portion 36, the second arm portion 43c comes into contact with the second spring restriction wall 36e, and the first arm portion 43b and the second arm portion 43c are in a state where they are not engaged with any of the first spring support surface 27a and the second spring support surface 27b. Therefore, the driving body 33 is put to a state where no bias force is applied thereto from the power assist spring 43.

Figure 11:
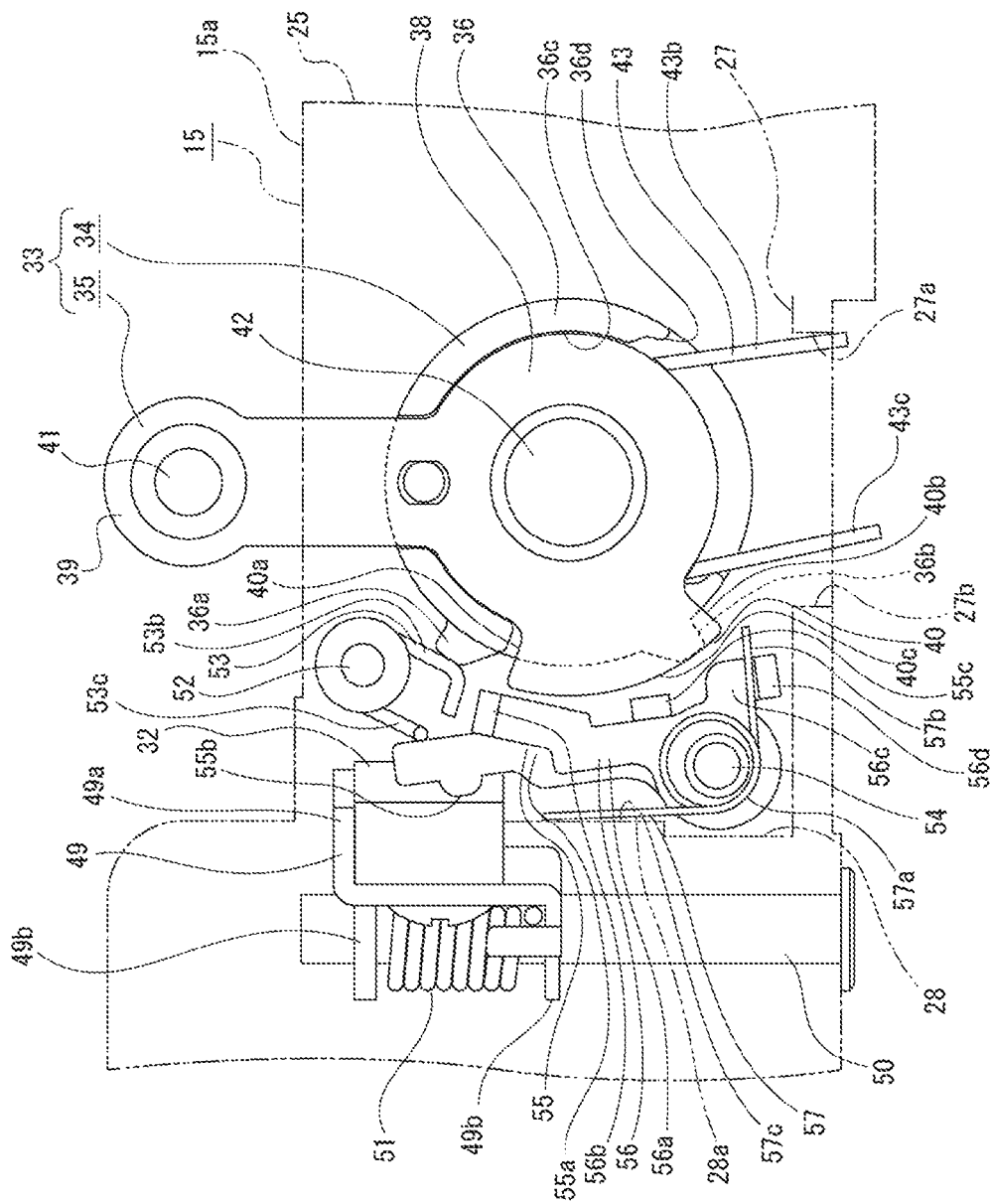
FIG. 11 A rear view showing a state where a lock lever is rotated and engagement with the engagement piece portion of the lock protrusion portion is released.

When the coil 30 is energized, the magnetic force of the magnet 29 with respect to the movable yoke 32 is lowered. When the magnetic force of the magnet 29 with respect to the movable yoke 32 is lowered, the bias force of the bias spring 53 becomes relatively larger than the magnetic force of the magnet 29 with respect to the movable yoke 32, and the main body portion 55a of the operation lever 55 is pressed by the second arm portion 53c so that the operation lever 55 is rotated in a direction in which it moves away from the lever holding portion 36 (see FIG. 11).

When the operation lever 55 is rotated in the direction in which it moves away from the lever holding portion 36, the movable yoke 32 is pressed by the pressing protrusion portion 55b of the operation lever 55, and the movable yoke 32 is rotated in a direction in which it tilts against the bias force of the return spring 51. At the same time, the extension portion 56a of the lock lever 56 is pressed by the presser protrusion portion 55c of the operation lever 55, and the lock lever 56 is rotated from the lock position to the unlock position, so that the lock protrusion portion 56b moves away from the first engagement portion 40a of the engagement piece portion 40 to release the engagement.

At this time, in the lock spring 57, along with the rotation of the lock lever 56, the first arm portion 57b is pressed by the spring reception protrusion portion 56d of the lock lever 56 so as to be displaced in a direction in which it approaches the second arm portion 57c, and thus the bias force increases.

Figure 12:
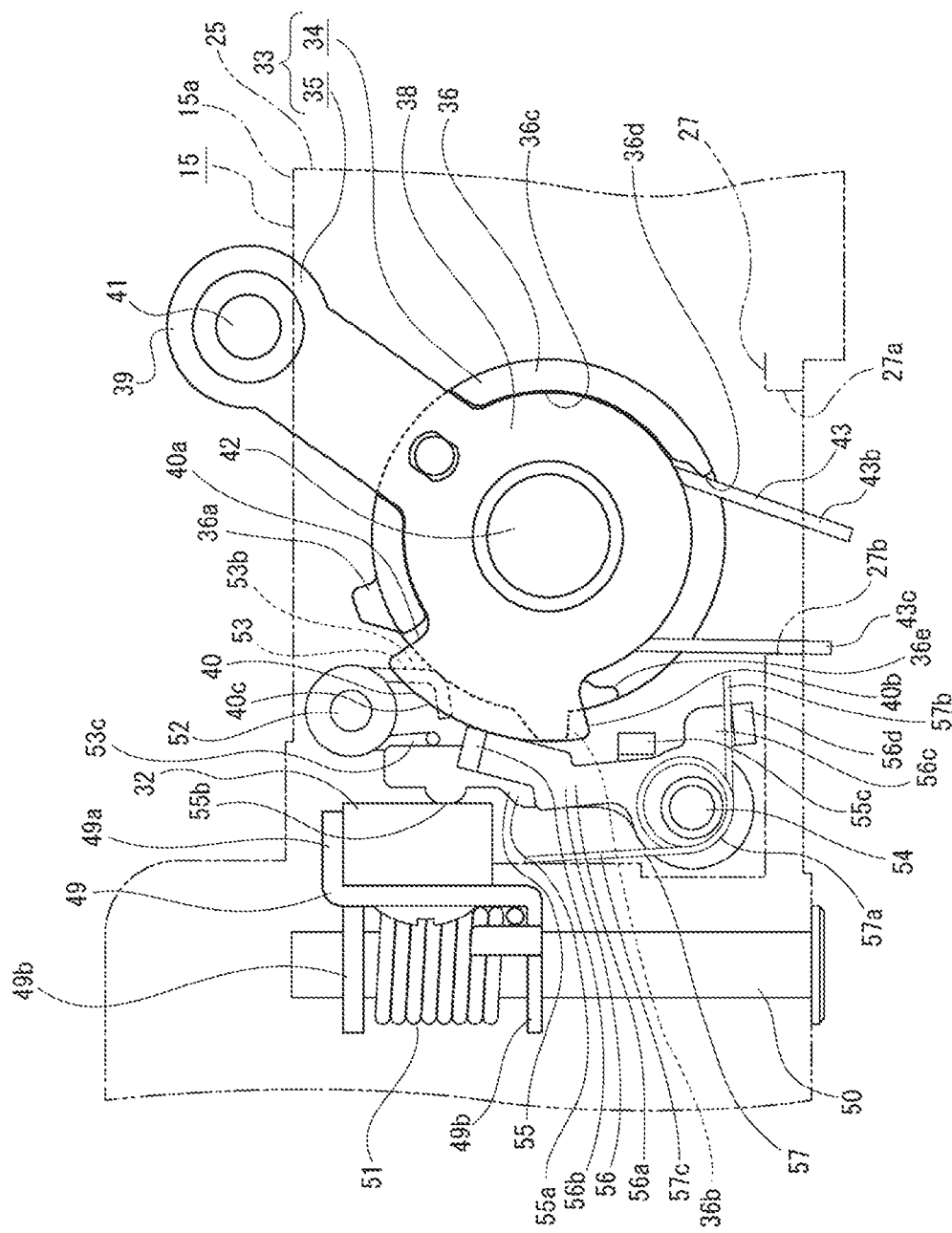
FIG. 12 A rear view showing a state where a driving body is rotated and the lock protrusion portion is sliding on a sliding portion of the engagement piece portion.

As described above, since the engagement between the lock protrusion portion 56b and the first engagement portion 40a is released, the lock on the first opening/closing blade 19 is released, and the magnet 29 to which the rotational force is applied is rotated integrally with the driving body 33 (see FIG. 12).

As the magnet 29 is rotated, a direction of the magnetic flux changes in accordance with the rotation of the magnet 29, and the magnetic force of the magnet 29 with respect to the movable yoke 32 increases. As the magnetic force of the magnet 29 with respect to the movable yoke 32 increases, the magnetic force of the magnet 29 with respect to the movable yoke 32 becomes relatively larger than the bias force of the bias spring 53, and the movable yoke 32 is drawn by the magnetic force of the magnet 29 to be rotated toward the vertical state.

As the movable yoke 32 is rotated, the pressing protrusion portion 55b is pressed by the movable yoke 32 so that the operation lever 55 is rotated in a direction in which it approaches the lever holding portion 36. In the bias spring 53, the second arm portion 53c is pressed by the main body portion 55a of the operation lever 55. At this time, the engagement between the first arm portion 53b and the first operation protrusion portion 36a of the lever holding portion 36 is released by the rotation of the driving body 33, and thus the bias spring 53 is put to a state where no bias force is generated since the first arm portion 53b is not brought into contact at any of the parts.

By the operation lever 55 being rotated in the direction in which it approaches the lever holding portion 36, the presser protrusion portion 55c is set apart from the extension portion 56a of the lock lever 56. At this time, the lock protrusion portion 56b of the lock lever 56 is rotated in the direction in which it approaches the lever holding portion 36 by the lock spring 57, and the lock protrusion portion 56b is in a state where it is in contact with the sliding portion 40c of the engagement piece portion 40. Therefore, along with the rotation of the driving lever 35, the lock protrusion portion 56b of the lock lever 56 slides on the sliding portion 40c.

At the start and immediately after the start of the rotation of the magnet 29, the bias force of the power assist spring 43 operates as auxiliary power with respect to the driving body 33 as described above. Therefore, at the start and immediately after the start of the rotation of the magnet 29, the bias force of the power assist spring 43 operates to increase a rotation torque of the magnet 29, and thus an operation speed of the first opening/closing blade 19 can be raised.

Figure 13:
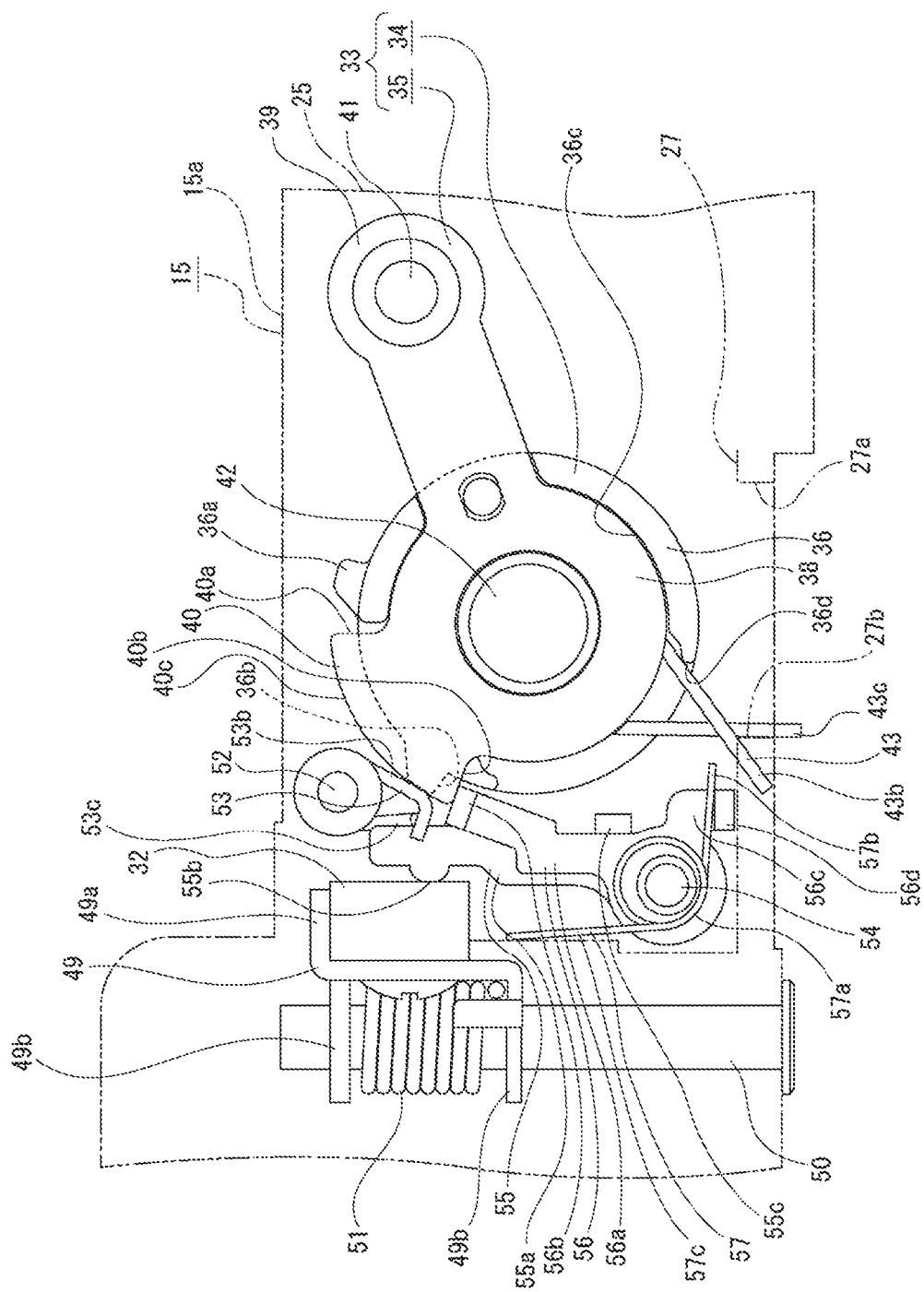
FIG. 13 A rear view showing a state where the lock protrusion portion is engaged with a second engagement portion of the engagement piece portion.

When the magnet 29 is further rotated integrally with the driving body 33, the first arm portion 53*b* of the bias spring 53 engages with the second operation protrusion portion 36*b* of the lever holding portion 36 by the rotation of the driving body 33 (see FIG. 13). Therefore, the bias spring 53 is displaced in the direction in which the first arm portion 53*b* approaches the second arm portion 53*c*, and the bias force is increased.

In the lock lever 56, the sliding of the lock protrusion portion 56*b* on the sliding portion 40*c* is released by the rotation of the driving body 33, and the lock protrusion portion 56*b* is rotated in the direction in which it approaches the lever holding portion 36 by the bias force of the lock spring 57, so that the lock lever 56 moves from the unlock position to the lock position again. When the lock lever 56 is rotated, the lock protrusion portion 56*b* engages with the second engagement portion 40*b* of the engagement piece portion 40. When the lock protrusion portion 56*b* is engaged with the second engagement portion 40*b*, the energization to the coil 30 is stopped and the rotation of the magnet 29 and the driving body 33 is stopped.

By the lock protrusion portion 56*b* of the lock lever 56 engaging with the second engagement portion 40*b* in this way, a rotation of the magnet 29 in a direction opposite to that described above is restricted. At this time, the first opening/closing blade 19 is already moved to the closing position, and the first opening/closing blade 19 is locked at the closing position.

When the magnet 29 is rotated the certain angle described above and is further rotated, the first arm portion 43*b* of the power assist spring 43 is further pressed by the first spring restriction wall 36*d* to be displaced in a direction in which it further approaches the second arm portion 43*c*, and the second arm portion 43*c* engages with the second spring support surface 27*b*. Therefore, a bias force in a direction opposite to the rotation direction is applied to the driving body 33 from the power assist spring 43 to the driving body 33, and the bias force of the power assist spring 43 operates as auxiliary power in a deceleration direction with respect to the driving body 33 and the magnet 29. Since the bias force of the power assist spring 43 operates as auxiliary power in a deceleration direction with respect to the driving body 33 and the magnet 29 in this way, the first opening/closing blade 19 is decelerated during a period from right before the first opening/closing blade 19 is moved to the closing position to when the first opening/closing blade 19 is moved to the closing position.

It should be noted that although the lock operation regarding the first opening/closing blade 19 has been described above, the locked state is set at the opening position or the closing position by an operation similar to that described above also regarding the second opening/closing blade 20.

Meanwhile, when the magnet 29 is rotated in the opposite direction and the first opening/closing blade 19 is moved toward the opening position in a state where the first opening/closing blade 19 is at the closing position, the movable yoke 32, the operation lever 55, and the lock lever 56 are operated in a manner similar to that described above, and the engagement of the lock protrusion portion 56*b* with the second engagement portion 40*b* is released. Next, the lock protrusion portion 56*b* slides on the sliding portion 40*c*, and then the lock protrusion portion 56*b* engages with the first engagement portion 40*a*. At this time, at the start and immediately after the start of the rotation of the magnet 29 in the opposite direction, the bias force of the power assist spring 43 is applied to the driving body 33 in the same direction as the rotation direction of the driving body 33 as described above. Therefore, also at the start and immediately after the start of the rotation of the magnet 29 in the opposite direction, the bias force of the power assist spring 43 operates to increase the rotation torque of the magnet 29, and thus the operation speed of the first opening/closing blade 19 can be raised.

As described above, at the start and immediately after the start of the rotation of the magnet 29, a rotational force in the same direction as the rotation of the magnet 29 is applied to the driving body 33 by the power assist spring 43, and a large torque with respect to the magnet 29 is applied.

In this way, in the blade opening/closing apparatus 11, since the power assist spring 43 that applies the bias force in an operation direction of the driving body 33 to the driving body 33 is provided, a torque in a predetermined rotation direction is applied to the driving body 33 and the magnet 29 by the power assist spring 43, and operation speed of the first opening/closing blade 19 and the second opening/closing blade 20 can be raised.

Further, since the power assist spring 43 that applies the bias force in the operation direction to the driving body 33 is provided, by controlling a current amount to be supplied to the coil 30 in accordance with a force amount (spring force) of the power assist spring 43, a mechanism for controlling the force amount of the power assist spring 43 does not need to be additionally provided, and the operation speed of the first opening/closing blade 19 and the second opening/closing blade 20 can be set to a desired speed while simplifying the structure.

As described above, in the blade opening/closing apparatus 11, the fixed yoke 31 and the movable yoke 32 are provided in the first magnetic driving portion 16 and the second magnetic driving portion 17, and the lock lever 56 functioning as the lock portion is moved between the lock position and the unlock position by the operation of the movable yoke 32.

Therefore, since the movable yoke 32 and the driving body 33 including the engagement piece portion 40 that functions as the lock portion are operated by the energization of the coil 30, different driving portions for operating the movable yoke 32 and the driving body 33 are unnecessary, and the first opening/closing blade 19 and the second opening/closing blade 20 can be locked while simplifying the structure.

Further, the rotatable lock lever 56 is provided as the lock portion, the rotatable operation lever 55 that causes the lock lever 56 to rotate from the lock position to the unlock position is provided, and the rotary shaft of the lock lever 56 and that of the operation lever 55 are coaxial.

Therefore, since the operation lever 55 and the lock lever 56 are rotated using the same shaft as a fulcrum, the structure can be simplified, and operation control can be facilitated.

<Operation Example of Opening/Closing Blade>

Hereinafter, a specific operational example of the first opening/closing blade 19 and the second opening/closing blade 20 will be described.

In a state where the power button 6 of the image pickup apparatus 1 is not operated, the first opening/closing blade 19 is at the opening position and the second opening/closing blade 20 is at the closing position as described above (see FIG. 9).

Figure 14:
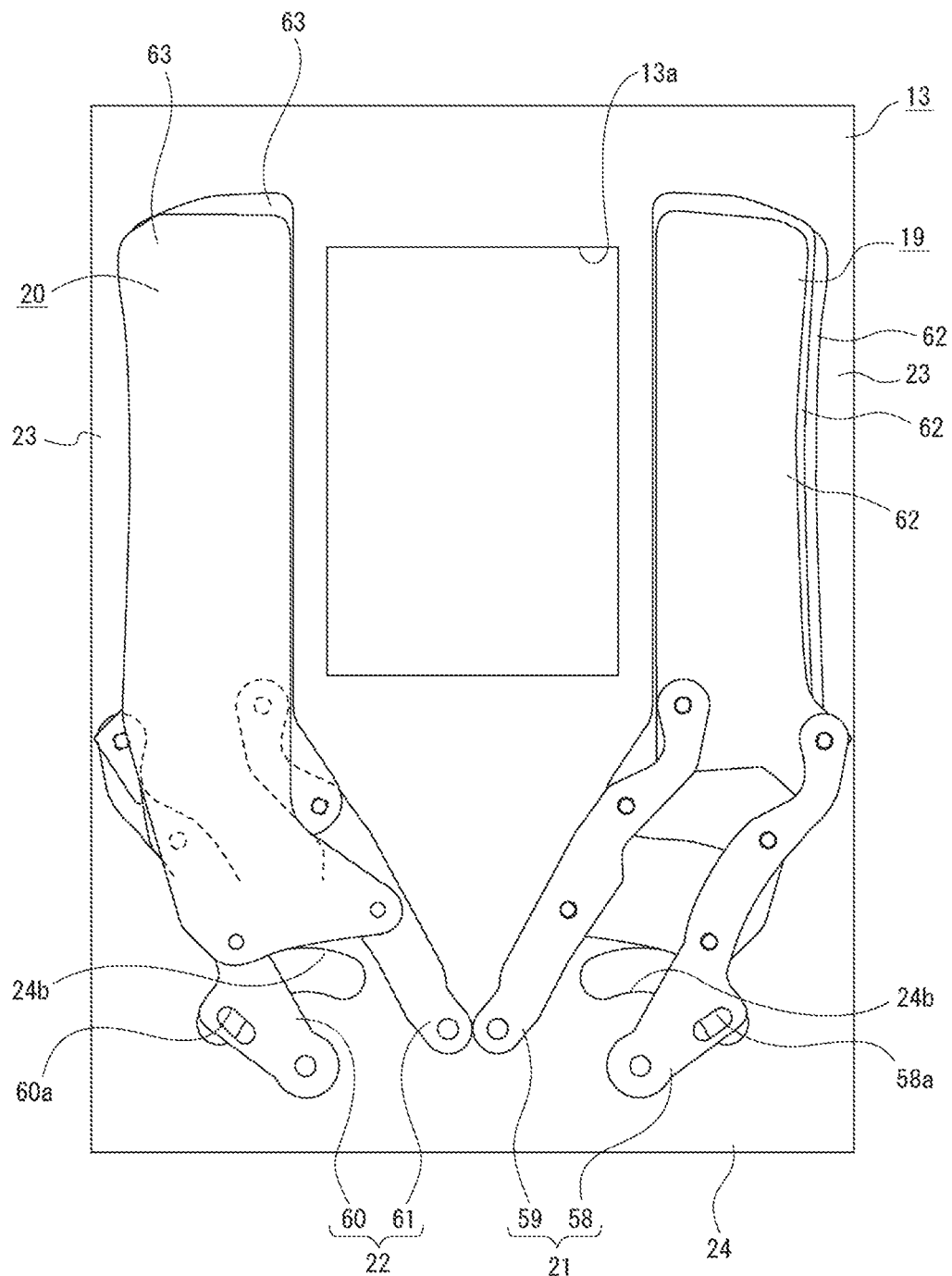
FIG. 14 A front view showing a state where the first opening/closing blade and the second opening/closing blade are at the opening position.

When the power button 6 of the image pickup apparatus 1 is operated, for example, a live view mode in which a photographer is capable of visually checking a subject by the display 7 and the finder 9 is set. At this time, a driving current is supplied to the coil 30 of the second magnetic driving portion 17, a driving force is generated in the second magnetic driving portion 17, and the second opening/closing blade 20 is moved from the closing position to the opening position (see FIG. 14).

By the second opening/closing blade 20 being moved to the opening position, the aperture 13a is opened to be put to a state where light taken in from the optical system 10 is capable of entering the image pickup device 12, and thus the photographer can visually check a subject by the display 7 and the finder 9.

Figure 15:
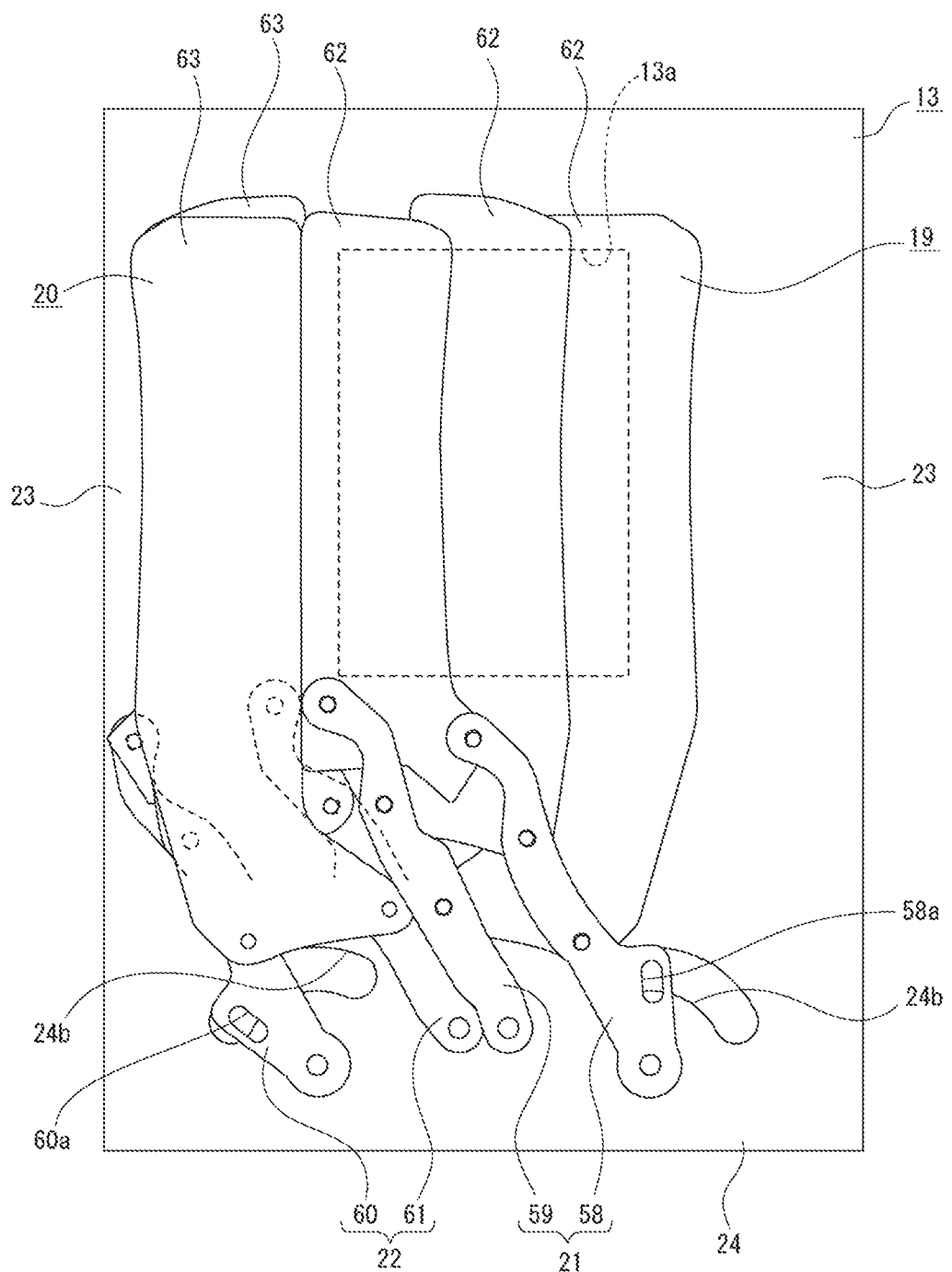
FIG. 15 A front view showing a state where the first opening/closing blade is at the closing position and the second opening/closing blade is at the opening position.

Next, when the shutter button 4 is operated to photograph the subject, a driving current is supplied to the coil 30 of the first magnetic driving portion 16, a driving force is generated in the first magnetic driving portion 16, and the first opening/closing blade 19 is moved from the opening position to the closing position to close the aperture 13a (see FIG. 15).

Figure 16:
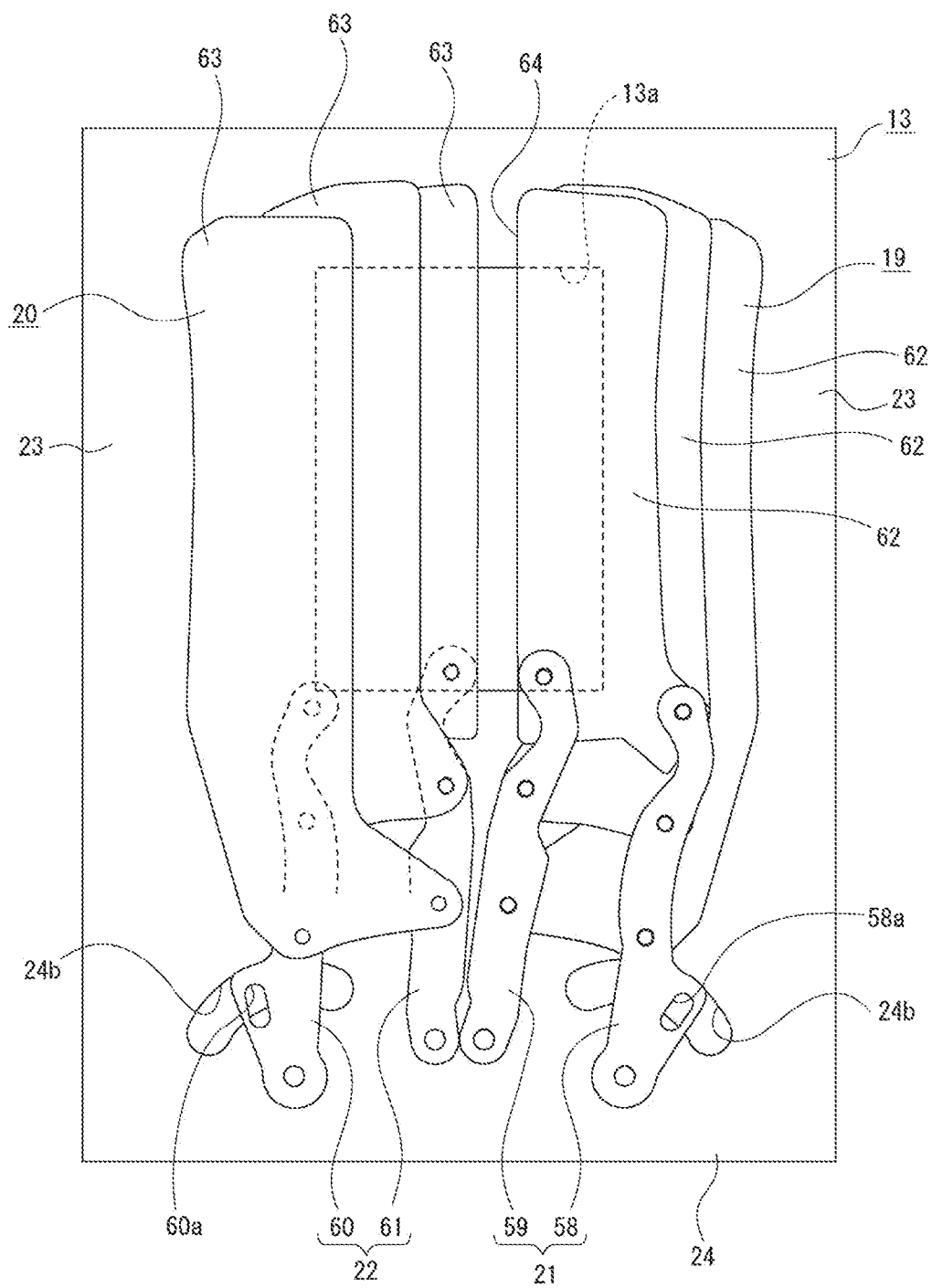
FIG. 16 A front view showing a state where slit traveling is performed.

When the first opening/closing blade 19 is moved to the closing position, a driving current in an opposite direction is supplied to the coil 30 of the first magnetic driving portion 16, and the first opening/closing blade 19 moves from the closing position toward the opening position. When the first opening/closing blade 19 is moved toward the opening position, a driving current in an opposite direction is supplied to the coil 30 of the second magnetic driving portion 17 immediately after the start of the movement of the first opening/closing blade 19 toward the opening position, and the second opening/closing blade 20 is moved so as to follow the first opening/closing blade 19 from the opening position toward the closing position. When the second opening/closing blade 20 is moved so as to follow the first opening/closing blade 19, a slit 64 having a predetermined width is formed between the first opening/closing blade 19 and the second opening/closing blade 20 (see FIG. 16), and the first opening/closing blade 19 and the second opening/closing blade 20 are moved toward the opening position or the closing position in a state where the slit 64 having a certain width is formed.

The operation of moving the first opening/closing blade 19 and the second opening/closing blade 20 in the state where the slit 64 is formed is an operation called slit running, and by the slit running, light enters the image pickup device 12 sequentially from one end portion to the other end portion via the transmission hole 14a of the presser plate 14, the slit 64, and the aperture 13a of the base body 13, to thus perform exposure.

When the slit running is ended, the first opening/closing blade 19 is moved to the opening position and the second opening/closing blade 20 is moved to the closing position so that the aperture 13a is closed again (see FIG. 9).

Figure 17:
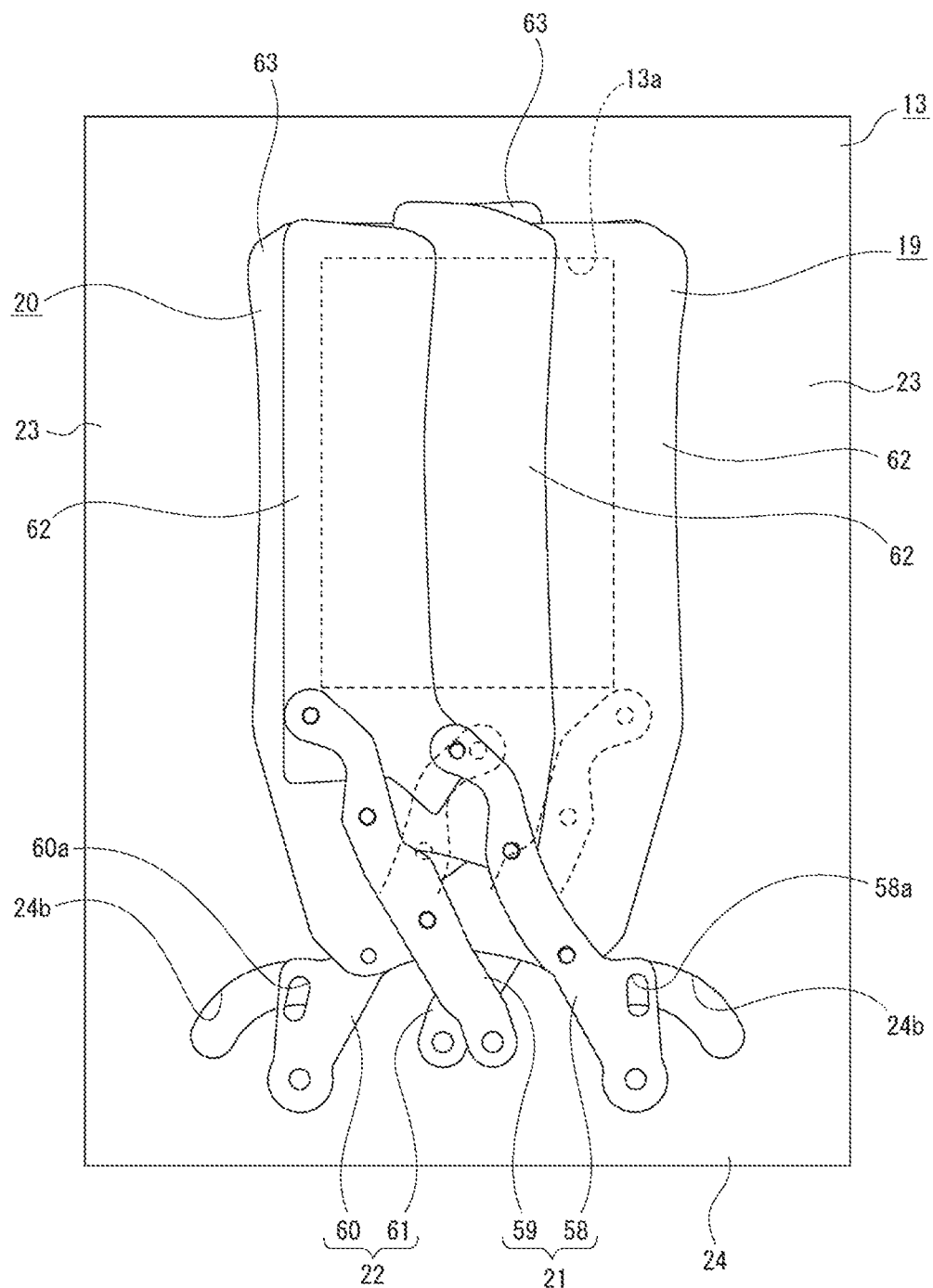
FIG. 17 A front view showing a state where the first opening/closing blade and the second opening/closing blade are at the closing position.

Subsequently, a driving current is supplied to the coil 30 of the first magnetic driving portion 16 so as to move the first opening/closing blade 19 to the closing position, and the aperture 13a is closed by the first opening/closing blade 19 and the second opening/closing blade 20 (see FIG. 17). In a state where the aperture 13a is closed by the first opening/closing blade 19 and the second opening/closing blade 20, light that has entered the image pickup device 12 during slit running is sequentially photoelectrically converted to generate image signals, and the generated image signals are transferred to the memory to generate an image of the subject.

It should be noted that the operation of sequentially photoelectrically converting light that has entered the image pickup device 12 during slit running and transferring the image signals to the memory may be carried out in a state where the first opening/closing blade 19 is moved to the opening position and the second opening/closing blade 20 is moved to the closing position to thus close the aperture 13a at the time slit running is ended (see FIG. 9).

MODIFIED EXAMPLE

Hereinafter, first and second modified examples of the blade opening/closing apparatus will be described. It should be noted that a blade opening/closing apparatus 11A according to the first modified example described below differs from the blade opening/closing apparatus 11 described above in that an actuator and an operation member are provided in place of the movable yoke and the bracket. A blade opening/closing apparatus 11B according to the second modified example differs from the blade opening/closing apparatus 11 described above in that the movable yoke as a part of the magnetic driving portion is not provided and a magnetic circuit portion is provided. Therefore, regarding each of the modified examples below, only parts that differ from those of the blade opening/closing apparatus 11 will be described in detail, and other parts that are similar to those of the blade opening/closing apparatus 11 will be denoted by the same symbols, and descriptions thereof will be omitted.

First Modified Example

First, the blade opening/closing apparatus 11A according to the first modified example will be described (see FIGS. 18 to 22).

Figure 18:
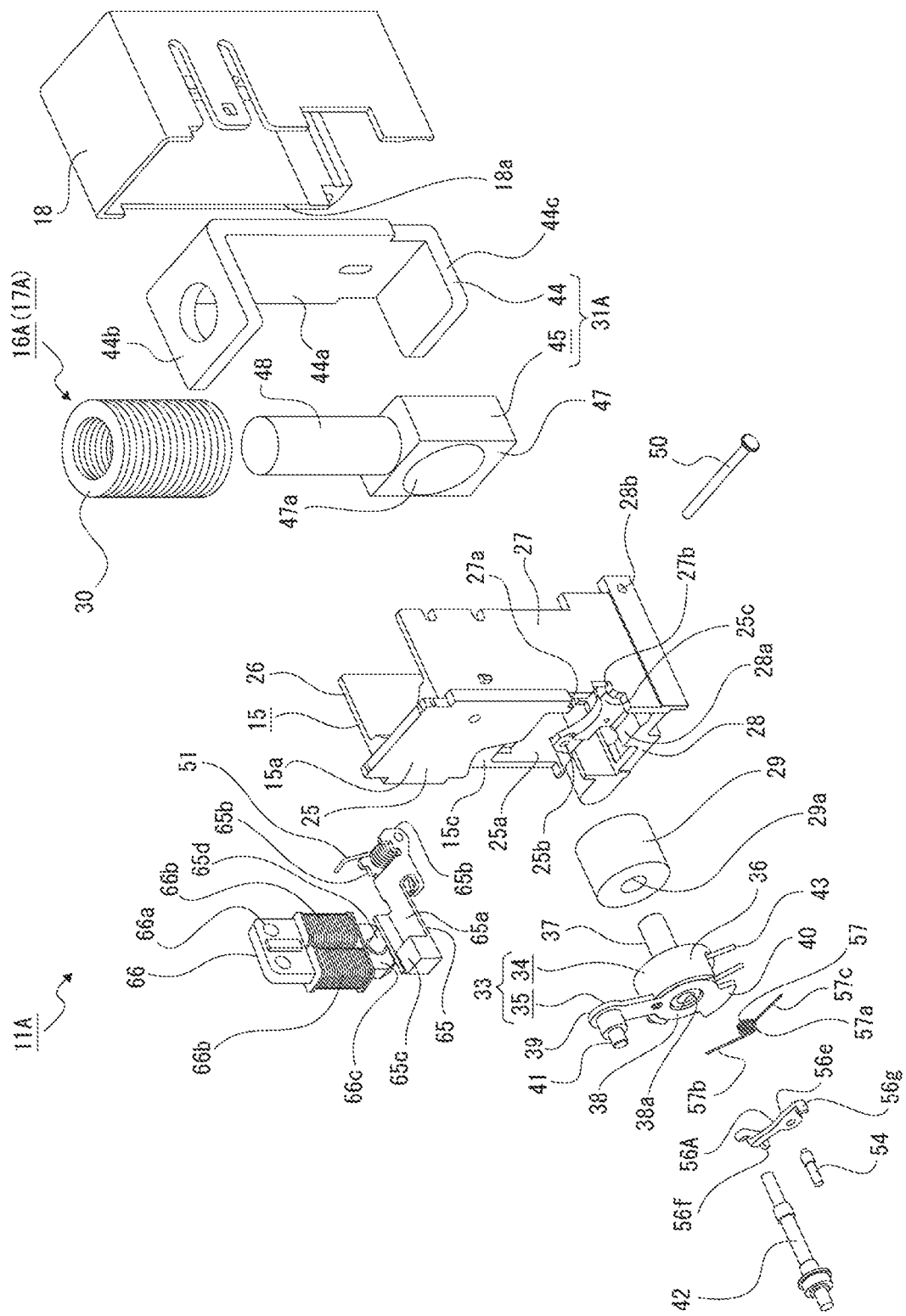
FIG. 18 An exploded perspective view showing a first modified example of the blade opening/closing apparatus together with FIGS. 19 to 22, and this view shows half the blade opening/closing apparatus on one side.

As shown in FIG. 18, the blade opening/closing apparatus 11A includes the base body 13, the presser plate 14, the accommodation case 15, a first magnetic driving portion 16A, a second magnetic driving portion 17A, the presser cover 18, the first opening/closing blade 19, the second opening/closing blade 20, the first link 21, and the second link 22, and is arranged on the front side of the image pickup device 12.

The first magnetic driving portion 16A includes the magnet 29, the coil 30, and a fixed yoke 31A, and the movable yoke 32 provided in the blade opening/closing apparatus 11 is not provided. Therefore, the notch 46 is not formed in the opposing surface portion 44c of the fixed yoke 31A, and the opposing surface portion 44b and the opposing surface portion 44c are formed to have the same size.

In the blade opening/closing apparatus 11A, an operation member 65 and an actuator 66 are provided in place of the movable yoke 32 and the bracket 49 that have been used in the blade opening/closing apparatus 11.

The operation member 65 is rotatable with respect to the accommodation case 15 with the support shaft 50 being a fulcrum. The operation member 65 includes a flat plate surface portion 65a having a substantially flat plate shape, supported shaft portions 65b, 65b that protrude from one end portion of the flat plate surface portion 65a, a pressing portion 65c that protrudes from the other end portion of the flat plate surface portion 65a, and a coupling shaft portion 65d that protrudes from an intermediate portion of the flat plate surface portion 65a, and the supported shaft portions 65b, 65b are supported by the support shaft 50. On the support shaft 50, the return spring 51 which is a torsion coil spring, for example, is supported between the supported shaft portions 65b, 65b.

The return spring 51 biases the operation member 65 in a direction in which it approaches the magnet 29.

The actuator 66 is coupled to the coupling shaft portion 65d of the operation member 65. The actuator 66 is, for example, an electromagnet, and includes a magnetic body 66a, electromagnetic coils 66b, 66b, and a movable portion 66c. In the actuator 66, the movable portion 66c protrudes or retracts to reciprocate with respect to the magnetic body 66a in accordance with presence or absence of energization to the electromagnetic coils 66b, 66b.

The spring support shaft 52, the bias spring 53, and the operation lever 55 that are provided in the blade opening/closing apparatus 11 are not provided in the blade opening/closing apparatus 11A.

A lock lever 56A is rotatably supported by the lever support shaft 54. The lock lever 56A functions as the lock portion that locks the first opening/closing blade 19 and the second opening/closing blade 20 at the opening position or the closing position.

The lock lever 56A includes an extension portion 56e extending substantially in the longitudinal direction, a to-be-operated portion 56f that protrudes rearwardly from one end portion of the extension portion 56e, and a lock protrusion portion 56g that protrudes rearwardly from the other end portion of the extension portion 56e. Substantially a center portion of the extension portion 56e of the lock lever 56A is supported by the lever support shaft 54.

In a state where the coil portion 57a of the lock spring 57 is supported by the lever support shaft 54, the first arm portion 57b engages with the to-be-operated portion 56f of the lock lever 56A, and the second arm portion 57c engages with the spring reception surface 28a formed in the partition portion 28 of the accommodation case 15.

Therefore, the lock lever 56A is biased by the lock spring 57 in a direction in which the to-be-operated portion 56f approaches the flat plate surface portion 65a of the operation member 65, and the lock protrusion portion 56g is biased in a direction in which it approaches the driving body 33.

<Operation of Blade Opening/Closing Apparatus According to First Modified Example>

Hereinafter, the lock operation and the like in the blade opening/closing apparatus 11A will be described (see FIGS. 19 to 22). It should be noted that since the lock operations regarding the first opening/closing blade 19 and the second opening/closing blade 20 are similar to each other, only the lock operation regarding the first opening/closing blade 19 will be described in detail below, and detailed descriptions on the lock operation regarding the second opening/closing blade 20 will be omitted.

In the initial state, the first opening/closing blade 19 is held at the opening position, for example, and the second opening/closing blade 20 is held at the closing position, for example.

Figure 19:
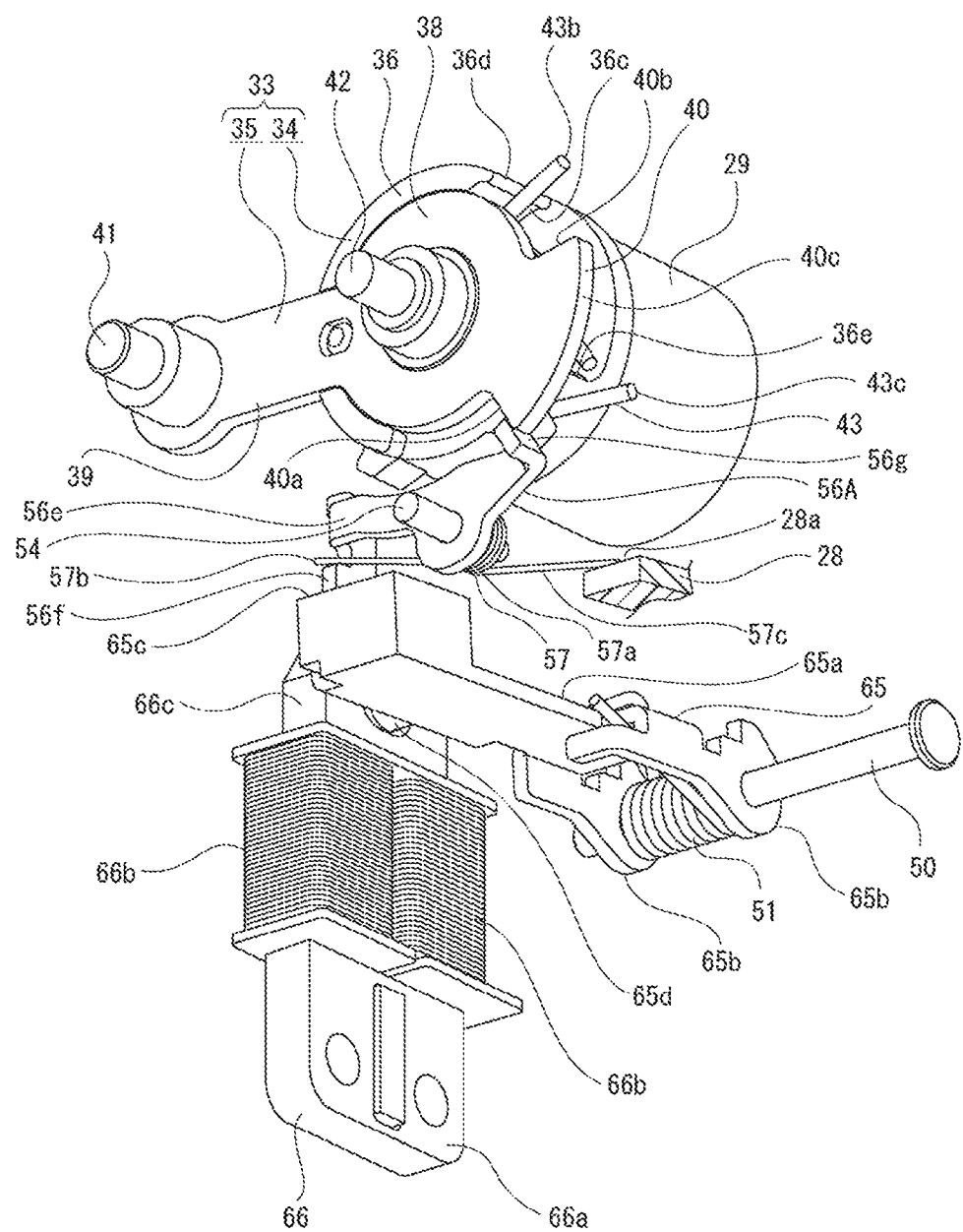
FIG. 19 A perspective view showing an operation of the blade opening/closing apparatus together with FIGS. 20 to 22, and this view shows a state where the lock protrusion portion is engaged with a first engagement portion of the engagement piece portion.

At this time, the electromagnetic coils 66b, 66b of the actuator 66 are not energized, and the movable portion 66c is at a retracted position with respect to the magnetic body 66a (see FIG. 19). Therefore, the operation member 65 is held in a state where the flat plate surface portion 65a is tilted from the vertical state. Since the lock lever 56A is biased by the bias force of the lock spring 57 in a direction in which the to-be-operated portion 56f approaches the operation member 65 and is held at the lock position, the to-be-operated portion 56f is pressed against the pressing portion 65c, and the lock protrusion portion 56g engages with the first engagement portion 40a of the engagement piece portion 40 in the driving lever 35.

By the lock protrusion portion 56g engaging with the first engagement portion 40a in this way, the rotation of the driving body 33 and the magnet 29 is restricted, and the first opening/closing blade 19 is locked at the opening position.

When the coil 30 is energized in a state where the first opening/closing blade 19 is locked at the opening position as described above, a rotational force is imparted to the magnet 29 by a magnetic flux generated in the first magnetic driving portion 16A.

At this time, the electromagnetic coils 66b, 66b of the actuator 66 are energized. When the electromagnetic coils 66b, 66b are energized, the movable portion 66c protrudes with respect to the magnetic body 66a, the to-be-operated portion 56f of the lock lever 56A is pressed by the pressing portion 65c of the operation member 65 biased by the return spring 51, and the lock lever 56A is rotated from the lock position to the unlock position against the bias force of the lock spring 57. By the rotation of the lock lever 56A, the lock protrusion portion 56g is set apart from the first engagement portion 40a of the engagement piece portion 40, and thus the engagement is released.

At this time, along with the rotation of the lock lever 56A, the first arm portion 57a of the lock spring 57 is pressed by the to-be-operated portion 56f of the lock lever 56A, and thus the bias force is increased. The operation member 65 is brought to a vertical state along with the movement of the movable portion 66c.

As described above, since the engagement of the lock protrusion portion 56g with the first engagement portion 40a is released, the lock on the first opening/closing blade 19 is released, and the magnet 29 to which the rotational force is applied is rotated integrally with the driving body 33.

Figure 20:
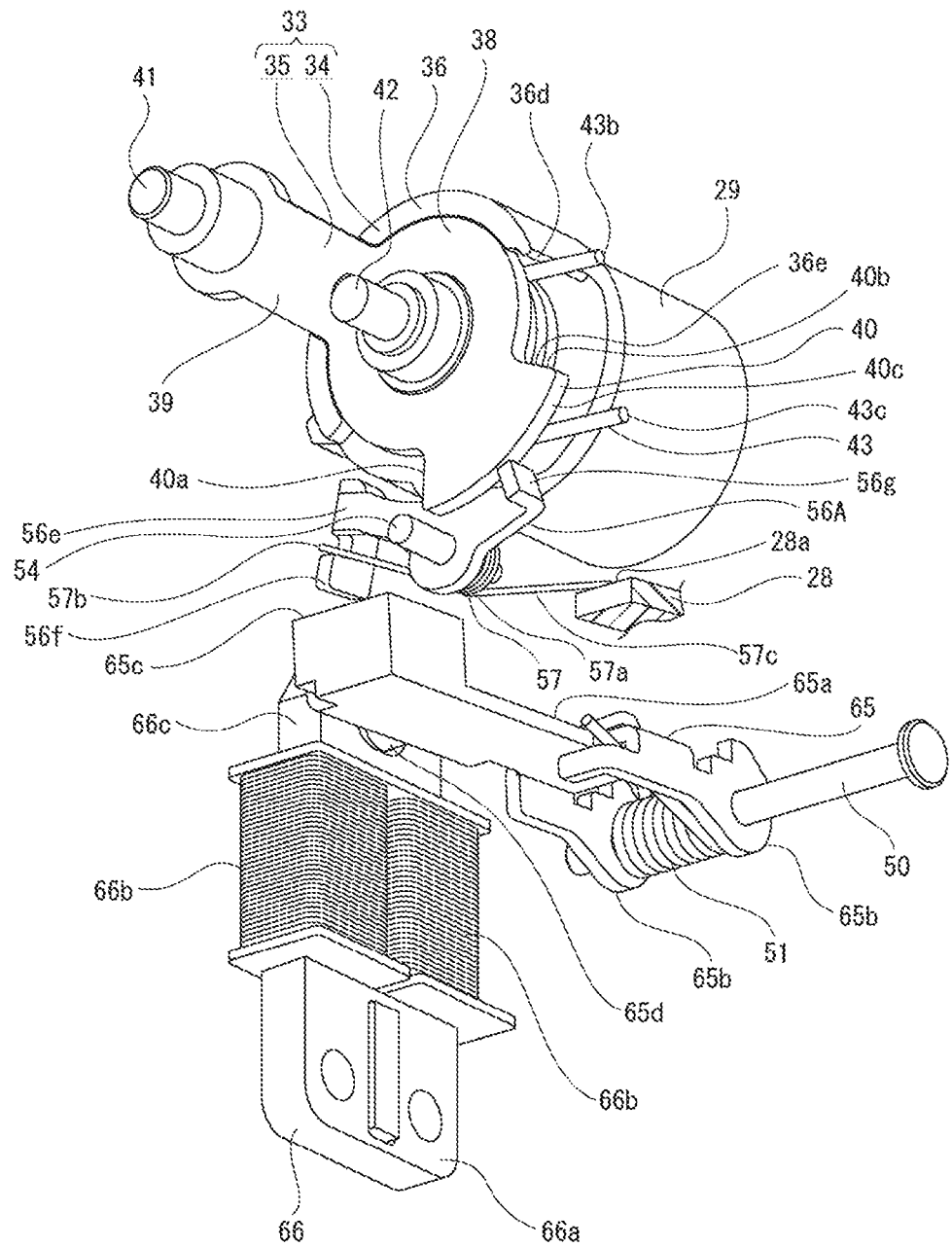
FIG. 20 A perspective view showing a state where the driving body is rotated and the lock protrusion portion is sliding on the sliding portion of the engagement piece portion.

At this time, the lock lever 56A is in a state where the lock protrusion portion 56g is in contact with the sliding portion 40c of the engagement piece portion 40 or a state where the lock protrusion portion 56g is slightly set apart from the sliding portion 40c, and the lock protrusion portion 56g is relatively moved along the sliding portion 40c along with the rotation of the driving body 33 (see FIG. 20).

Figure 21:
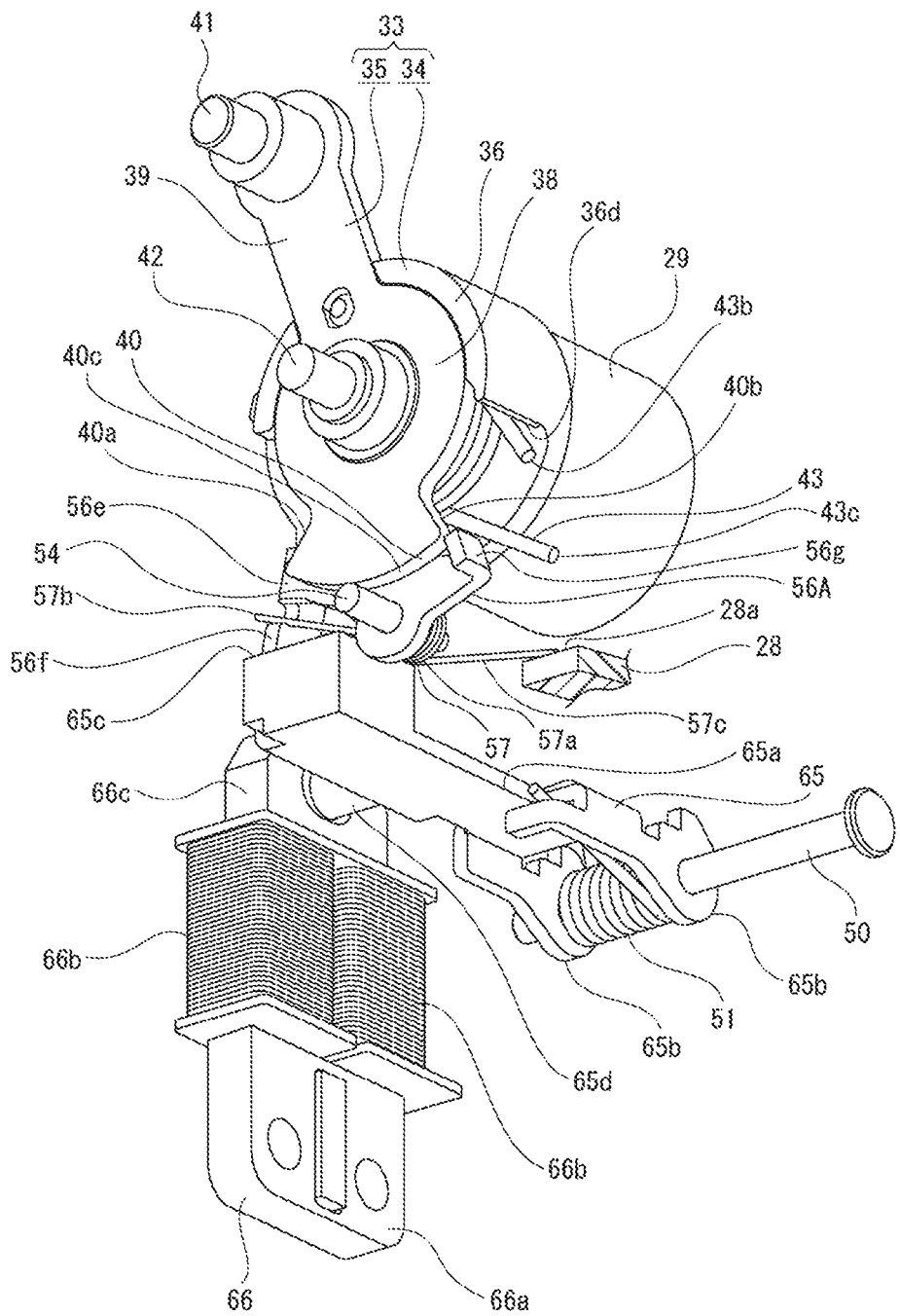
FIG. 21 A perspective view showing a state immediately before the lock protrusion portion engages with the second engagement portion of the engagement piece portion.

When the magnet 29 is further rotated integrally with the driving body 33, the second engagement portion 40b of the engagement piece portion 40 in the driving body 33 reaches a position corresponding to the lock protrusion portion 56g of the lock lever 56A (see FIG. 21). At this time, the energization to the electromagnetic coils 66b, 66b of the actuator 66 is stopped, and the movable portion 66c is retracted with respect to the magnetic body 66a. In addition, the energization to the coil 30 is also stopped, and the rotation of the magnet 29 and the driving body 33 is stopped.

Figure 22:
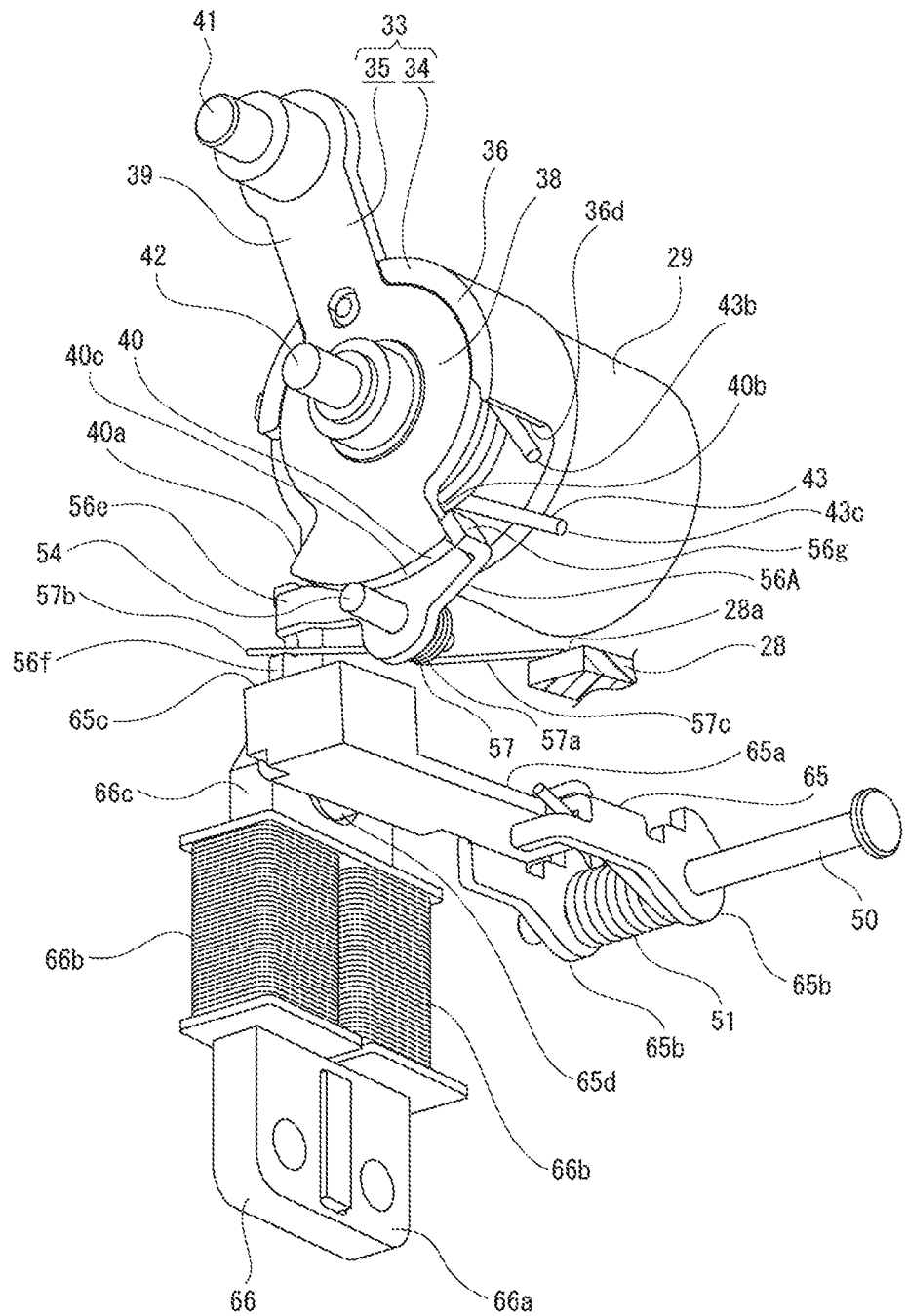
FIG. 22 A perspective view showing a state where the lock protrusion portion is engaged with the second engagement portion of the engagement piece portion.

When the movable portion 66c is retracted with respect to the magnetic body 66a, the lock lever 56A is rotated in a direction in which the lock protrusion portion 56g approaches the lever holding portion 36 by the bias force of the lock spring 57, to move from the unlock position to the lock position again (see FIG. 22). When the lock lever 56A is rotated, the lock protrusion portion 56g engages with the second engagement portion 40b of the engagement piece portion 40.

By the lock protrusion portion 56g of the lock lever 56A engaging with the second engagement portion 40b in this way, the rotation of the magnet 29 in a direction opposite to that described above is restricted, and at this time, the first opening/closing blade 19 is already moved to the closing position, and the first opening/closing blade 19 is locked at the closing position.

It should be noted that the stop of the energization to the electromagnetic coils 66b, 66b of the actuator 66 may be performed while the lock protrusion portion 56g is relatively moved along the sliding portion 40c along with the rotation of the driving body 33. In this case, the lock lever 56A biased by the lock spring 57 is relatively moved along the sliding portion 40c in a state where the lock protrusion portion 56g is sliding on the sliding portion 40c of the engagement piece portion 40. When the second engagement portion 40b reaches the position corresponding to the lock protrusion portion 56g, the lock lever 56A is rotated by the bias force of the lock spring 57 so that the lock protrusion portion 56g engages with the second engagement portion 40b to performing locking.

Further, although the lock operation regarding the first opening/closing blade 19 has been described above, the locked state is set at the opening position or the closing position by an operation similar to that described above also regarding the second opening/closing blade 20.

Meanwhile, when the magnet 29 is rotated in the opposite direction and the first opening/closing blade 19 is moved toward the opening position in a state where the first opening/closing blade 19 is at the closing position, the operation member 65 and the lock lever 56A are operated in a manner similar to that described above in accordance with presence or absence of energization to the electromagnetic coils 66b, 66b of the actuator 66, and the engagement of the lock protrusion portion 56g with the second engagement portion 40b is released. Next, the lock protrusion portion 56g becomes slidable on the sliding portion 40c, and then the lock protrusion portion 56g engages with the first engagement portion 40a.

As described above, in the blade opening/closing apparatus 11A, the actuator 66 that causes the lock lever 56A that functions as the lock portion to operate is provided.

Therefore, since the lock lever 56A is operated by the actuator 66 and the driving body 33 including the engagement piece portion 40 that functions as the to-be-locked portion is operated by the first magnetic driving portion 16A or the second magnetic driving portion 17A, operation control of the lock portion and the to-be-locked portion is performed separately, and operational reliability can be improved.

Second Modified Example

Next, the blade opening/closing apparatus 11B according to the second modified example will be described (see FIGS. 23 to 29).

Figure 23:
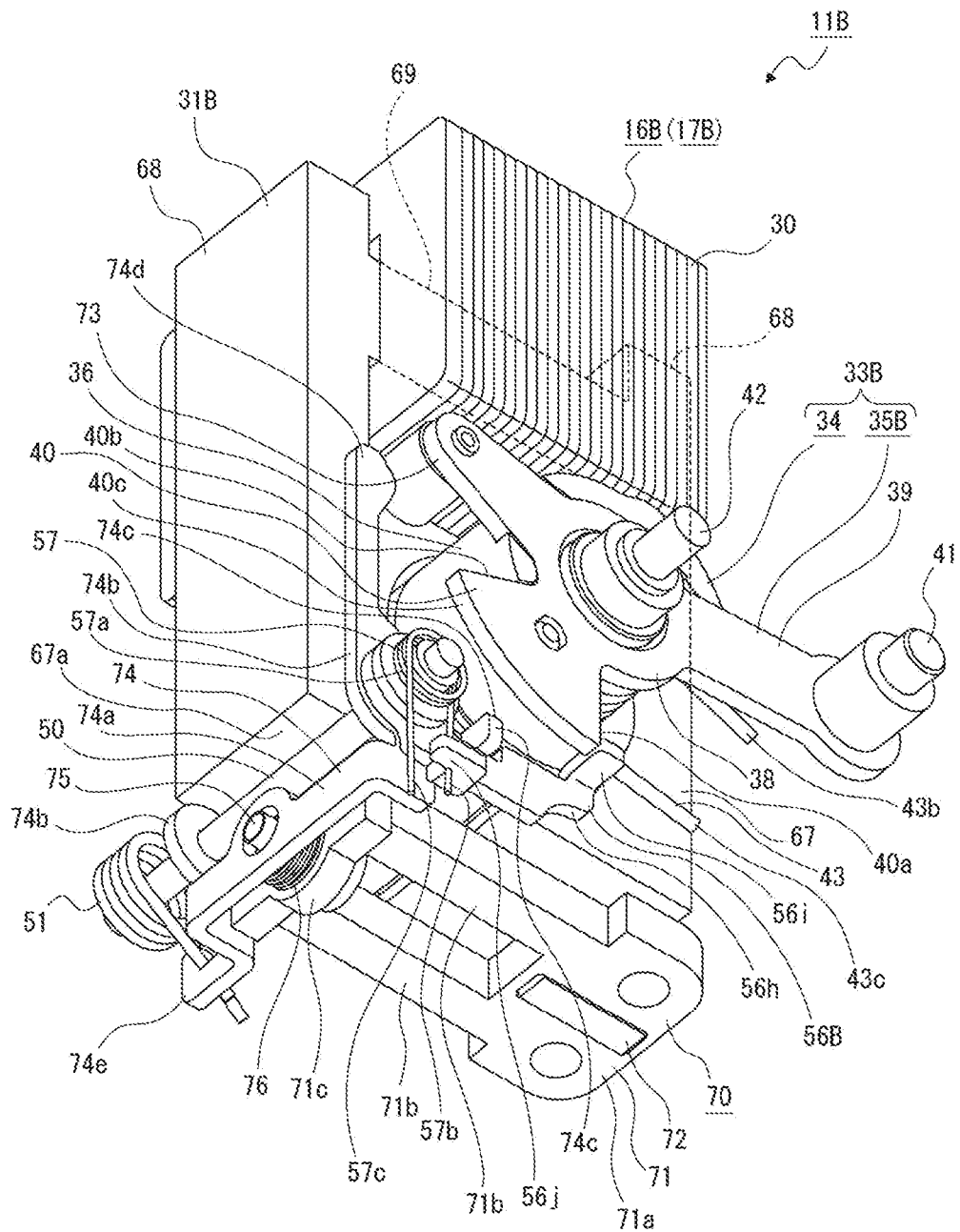
FIG. 23 A perspective view showing a second modified example of the blade opening/closing apparatus together with FIGS. 24 to 29, and in this view, a part of the blade opening/closing apparatus is omitted.

The blade opening/closing apparatus 11B includes the base body 13, the presser plate 14, the accommodation case 15, a first magnetic driving portion 16B, a second magnetic driving portion 17B, the presser cover 18, the first opening/closing blade 19, the second opening/closing blade 20, the first link 21, and the second link 22, and is arranged on the front side of the image pickup device 12 (see FIG. 23).

The first magnetic driving portion 16B includes the magnet 29, the coil 30, and a fixed yoke 31B, and the movable yoke 32 provided in the blade opening/closing apparatus 11B is not provided.

The fixed yoke 31B includes a base portion 67, protrusion portions 68, 68 that protrude from both end portions of the base portion 67 in the same direction, and a coil holding portion 69 that couples the protrusion portions 68, 68, and is arranged in a state where the magnet 29 is inserted into the base portion 67. A surface of the base portion 67 on the other side of a side where the protrusion portions 68, 68 are positioned is formed as an opposing surface 67a.

The coil holding portion 69 holds the coil 30.

A magnetic circuit portion 70 is attached to the accommodation case 15, and the magnetic circuit portion 70 opposes the opposing surface 67a of the fixed yoke 31B. The magnetic circuit portion 70 includes a yoke body 71 and an auxiliary magnet 72.

The yoke body 71 includes a yoke base 71a, yoke protrusion portions 71b, 71b that protrude from both end portions of the yoke base 71a in the same direction, and a yoke movable portion 71c positioned on the other side of the yoke base 71a with the yoke protrusions 71b, 71b interposed therebetween. The yoke movable portion 71c can be displaced with respect to the yoke protrusion portions 71b, 71b.

The auxiliary magnet 72 is arranged while being embedded in the yoke base 71a of the yoke body 71.

It should be noted that at least one of the yoke protrusion portions 71b, 71b of the yoke body 71 may hold a driving coil. By energizing the driving coil and generating a force, it becomes possible to use the generated force as auxiliary power in the magnetic circuit portion 70.

The magnet 29 is fixed to a driving body 33B.

The driving body 33B is formed by coupling the base member 34 and a driving lever 35B. It should be noted that although, regarding the blade opening/closing apparatus 11B according to the second modified example, a case where the respective positions of the first engagement portion 40a and second engagement portion 40b of the engagement piece portion 40 are made opposite to those of the blade opening/closing apparatus 11 and the blade opening/closing apparatus 11A in a circumferential direction will be described as an example, the respective positions of the first engagement portion 40a and second engagement portion 40b of the engagement piece portion 40 may be set to have the same positional relationship as the blade opening/closing apparatus 11 and the blade opening/closing apparatus 11A also regarding the blade opening/closing apparatus 11B.

The driving lever 35B includes an annular coupling plate portion 38, an arm plate portion 39 that protrudes in a radial direction from the coupling plate portion 38, the engagement piece portion 40 that protrudes in the radial direction from the coupling plate portion 38, and a rotation protrusion portion 73 that protrudes in the radial direction from the coupling plate portion 38. The arm plate portion 39, the engagement piece portion 40, and the rotation protrusion portion 73 respectively protrude in the radial direction from the coupling plate portion 38 at substantially equiangular positions in a circumferential direction.

In the blade opening/closing apparatus 11B, an operation lever 74 is provided in place of the bracket 49 and the operation lever 55 used in the blade opening/closing apparatus 11. In addition, the blade opening/closing apparatus 11B is not provided with the spring support shaft 52 and the bias spring 53 that are provided in the blade opening/closing apparatus 11.

The operation lever 74 is rotatably supported by the accommodation case 15 with the support shaft 50 being a fulcrum. The operation lever 74 includes a substantially U-shaped coupling surface portion 74a, supported shaft portions 74b, 74b that respectively protrude from both end portions of the coupling surface portion 74a in the front-back direction, a presser protrusion portion 74c that protrudes from the rear-side supported shaft portion 74b, an arm protrusion portion 74d that protrudes from the rear-side supported shaft portion 74b, and a spring hook protrusion portion 74e that protrudes from the front-side supported shaft portion 74b. In the operation lever 74, the supported shaft portions 74b, 74b are supported by the support shaft 50.

A coupling shaft 75 is coupled to the coupling surface portion 74a of the operation lever 74, and the yoke movable portion 71c of the yoke body 71 is coupled to the coupling surface portion 74a by the coupling shaft 75. The yoke movable portion 71c is coupled to the coupling shaft 75 in a state where it can move in an axial direction.

An operation spring 76 is supported by the coupling shaft 75. The operation spring 76 is, for example, a compression coil spring, and the yoke movable portion 71c is biased in a direction in which it moves away from the coupling surface portion 74a by the operation spring 76.

The return spring 51 is supported by the support shaft 50, and one end portion of the return spring 51 is supported by the spring hook protrusion portion 74e of the operation lever 74. The operation lever 74 is biased by the return spring 51 in a direction in which the arm protrusion portion 74d approaches the driving body 33B.

A lock lever 56B is rotatably supported by the support shaft 50 on a rear side of the operation lever 74. The lock lever 56B functions as the lock portion that locks the first opening/closing blade 19 and the second opening/closing blade 20 at the opening position or the closing position.

The lock lever 56B includes an extension portion 56h extending substantially in the longitudinal direction, a lock protrusion portion 56i that protrudes rearwardly from one end portion of the extension portion 56h, and a spring engagement portion 56j that protrudes rearwardly from an intermediate portion of the extension portion 56h. The other end portion of the extension portion 56h of the lock lever 56B is supported by the support shaft 50.

The lock spring 57 is supported by the support shaft 50. In the lock spring 57, the first arm portion 57b engages with the spring engagement portion 56j of the lock lever 56B. Therefore, the lock lever 56B is biased by the lock spring 57 in a direction in which the lock protrusion portion 56i approaches the driving body 33B.

<Operation of Blade Opening/Closing Apparatus According to Second Modified Example>

Hereinafter, a lock operation and the like in the blade opening/closing apparatus 11B will be described. It should be noted that since the lock operations regarding the first opening/closing blade 19 and the second opening/closing blade 20 are similar to each other, only the lock operation regarding the first opening/closing blade 19 will be described in detail below, and detailed descriptions of the lock operation regarding the second opening/closing blade 20 will be omitted.

In the initial state, the first opening/closing blade 19 is held at the opening position, for example, and the second opening/closing blade 20 is held at the closing position, for example.

Figure 24:
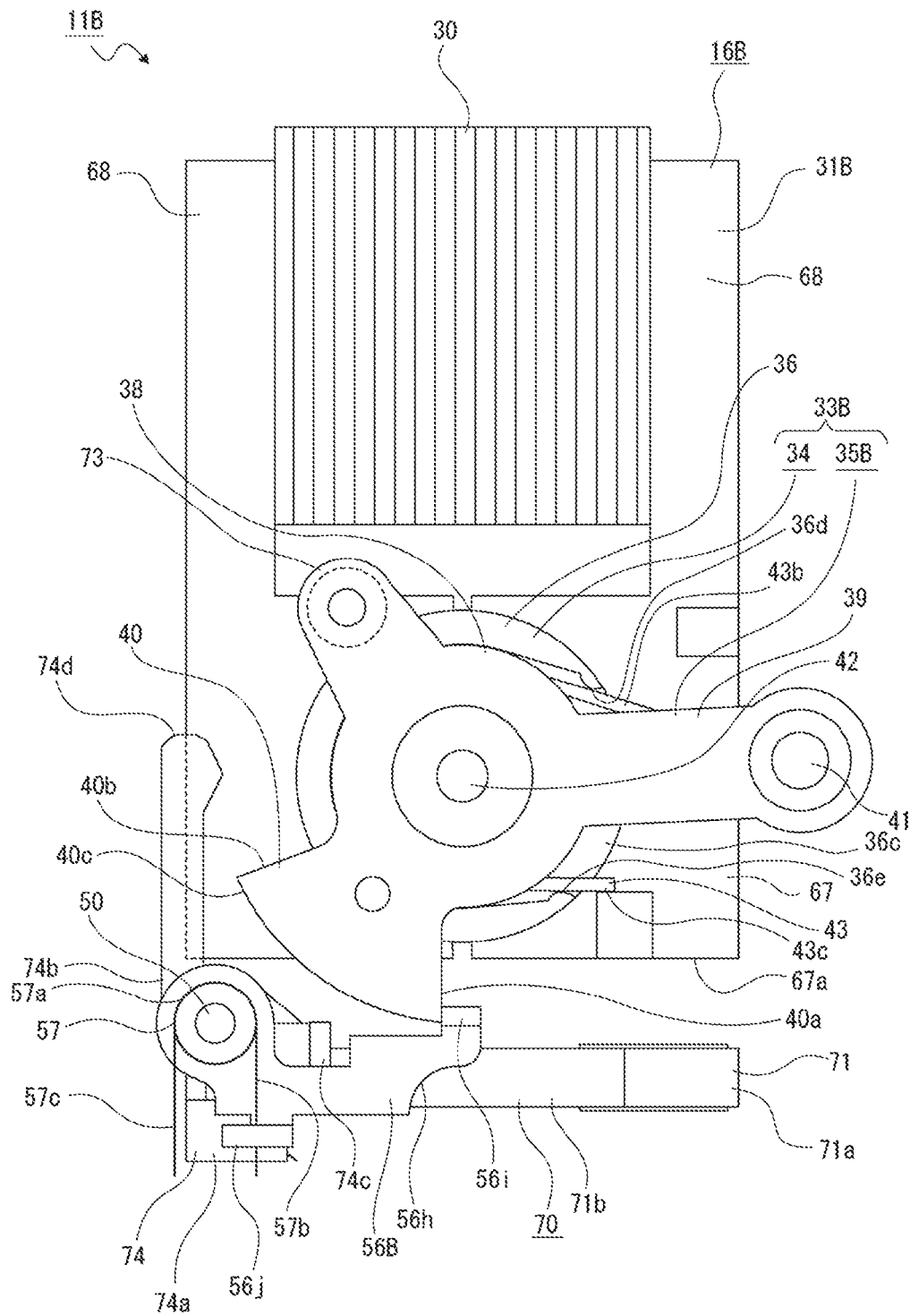
FIG. 24 A rear view showing an operation of the blade opening/closing apparatus together with FIGS. 25 to 29, and this view shows a state where the lock protrusion portion is engaged with the first engagement portion of the engagement piece portion.
Figure 25:
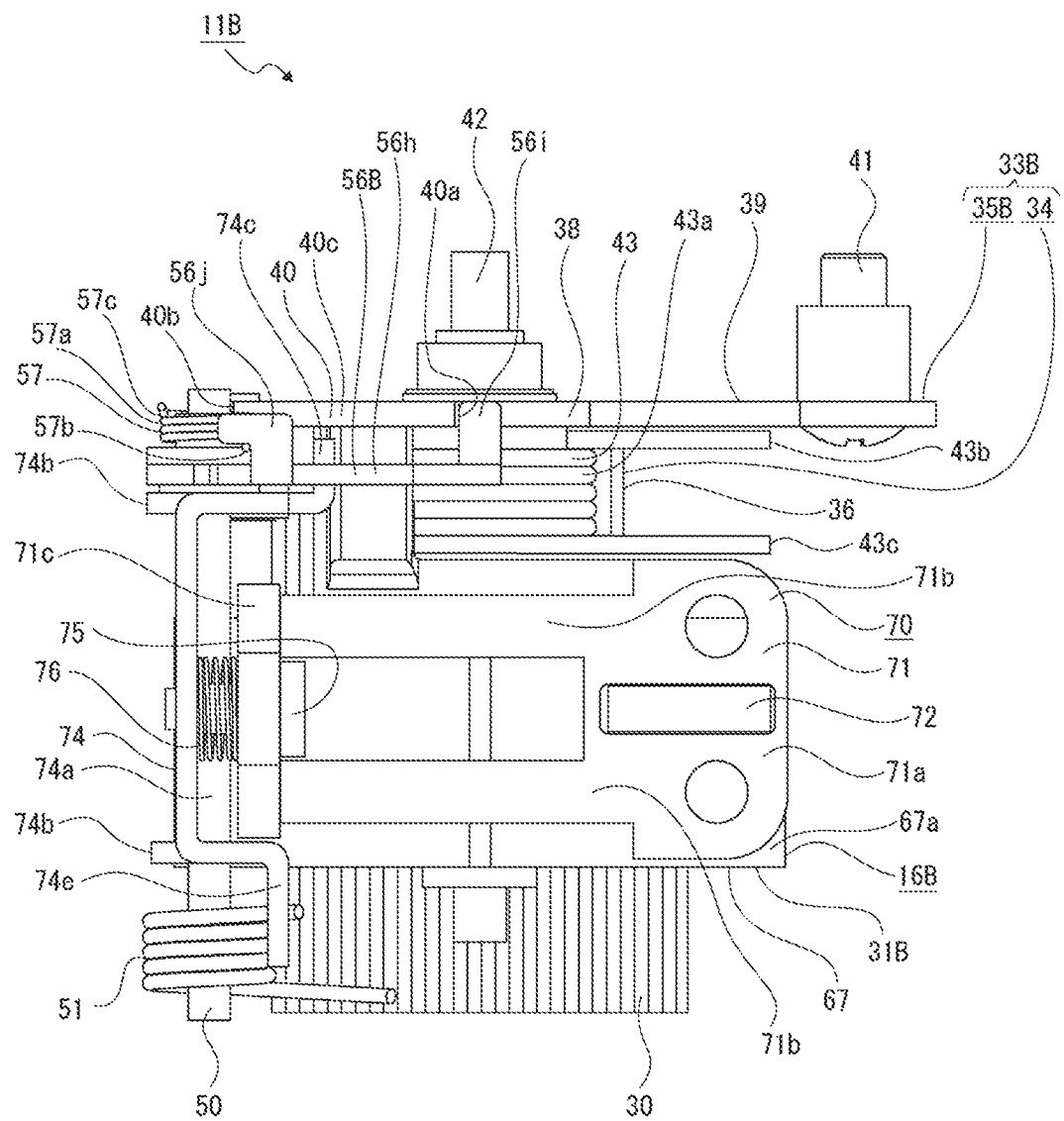
FIG. 25 A side view showing the same state as FIG. 24.
Figure 26:
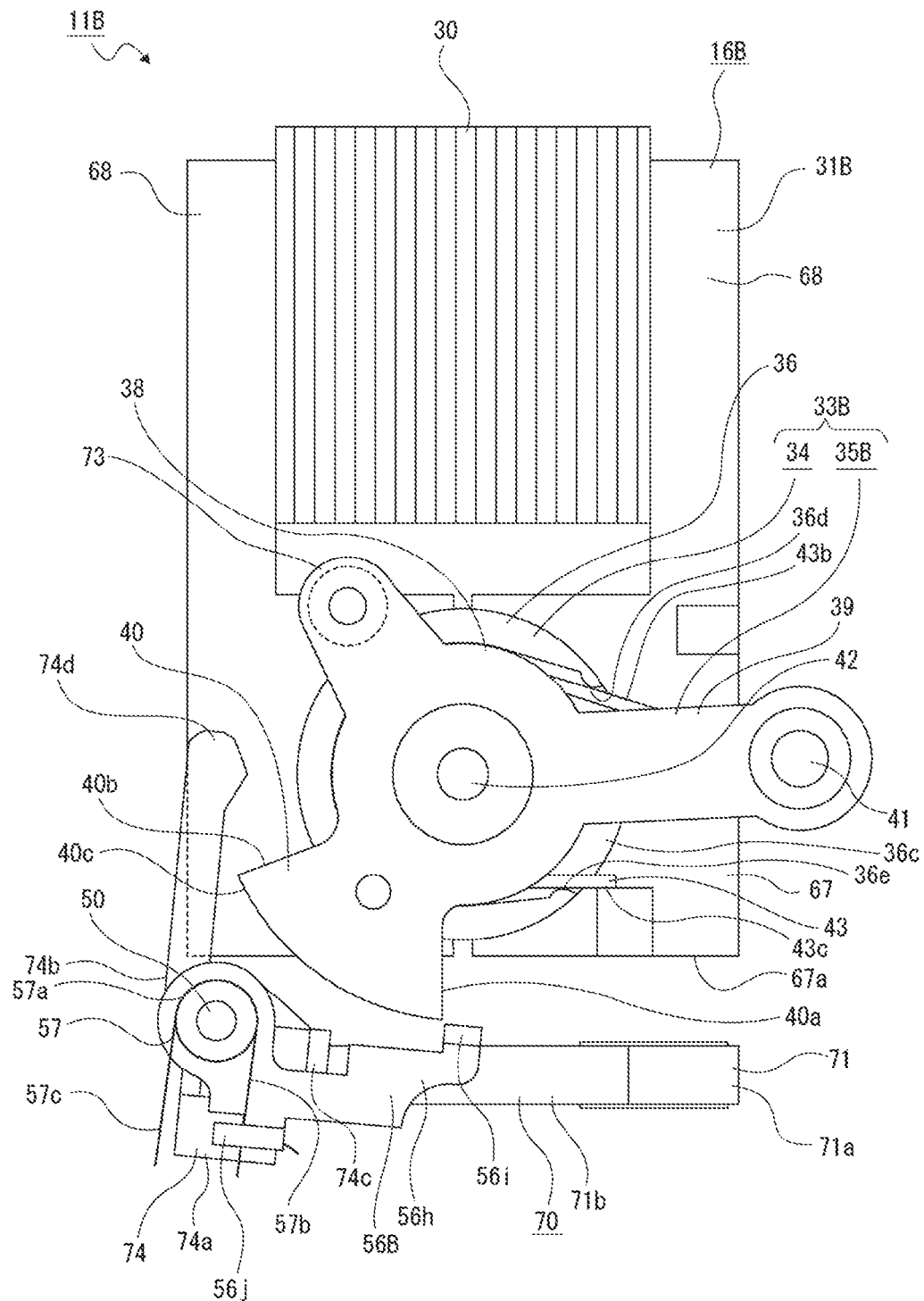
FIG. 26 A rear view showing a state where the lock lever is rotated and engagement with the engagement piece portion of the lock protrusion portion is released.
Figure 27:
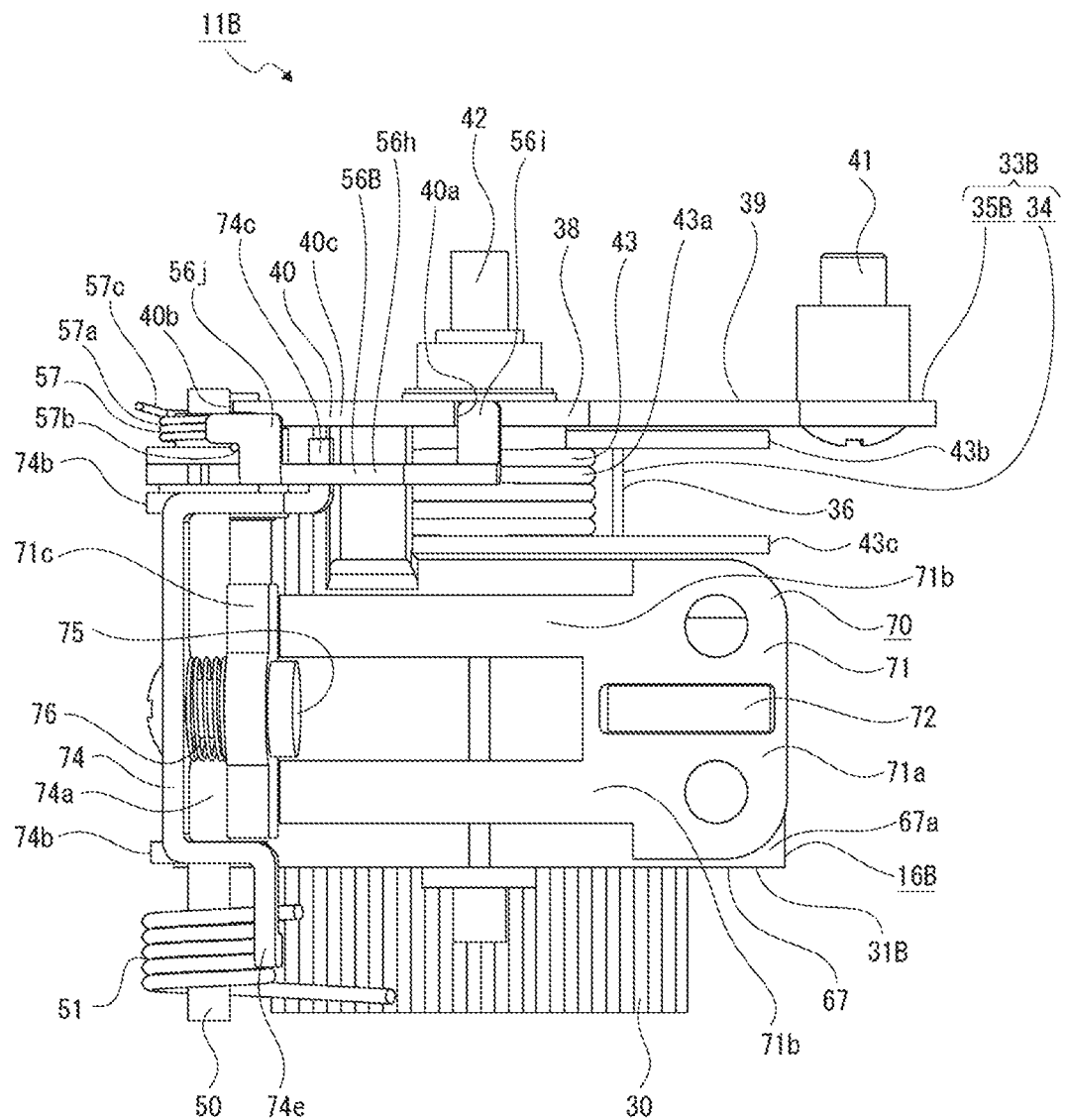
FIG. 27 A side view showing the same state as FIG. 26.

At this time, the first opening/closing blade 19 is locked at the opening position as follows (see FIGS. 24 and 25).

The yoke body 71 is held in a state where the yoke movable portion 71c is drawn to the yoke protrusion portions 71b, 71b by a magnetic force of the auxiliary magnet 72 and is in contact with the yoke protrusion portions 71b, 71b.

In the operation lever 74, the coupling surface portion 74a is drawn to the yoke protrusion portions 71b, 71b side by the magnetic force of the auxiliary magnet 72 against the bias force of the return spring 51, and the arm protrusion portion 74d is held at a position most distant from the lever holding portion 36.

The lock lever 56B is at the lock position by being biased by the bias force of the lock spring 57 in a direction in which the lock protrusion portion 56i approaches the lever holding portion 36, and the lock protrusion portion 56i is engaged with the first engagement portion 40a of the engagement piece portion 40 in the driving lever 35B.

By the lock protrusion portion 56i engaging with the first engagement portion 40a in this way, the rotation of the driving body 33B and the magnet 29 is restricted, and the first opening/closing blade 19 is locked at the opening position.

When the coil 30 is energized in a state where the first opening/closing blade 19 is locked at the opening position as described above, a rotational force is imparted to the magnet 29 by a magnetic flux generated in the first magnetic driving portion 16B.

At this time, the magnetic flux generated in the first magnetic driving portion 16B due to the energization influences the magnetic circuit portion 70, and the magnetic flux generated in one of the yoke protrusion portions 71b, 71b of the yoke body 71 is saturated and does not change, but the magnetic flux generated in the other one of the yoke protrusion portions 71b, 71b of the yoke body 71 is weakened. Therefore, the magnetic force with respect to the yoke movable portion 71c of the yoke body 71 and the coupling surface portion 74a of the operation lever 74 is weakened, and the operation lever 74 is rotated in a direction in which the arm protrusion portion 74d approaches the lever holding portion 36 and the presser protrusion portion 74c moves away from the lever holding portion 36 by the bias force of the return spring 51 (see FIGS. 26 and 27). At this time, the yoke movable portion 71c is set apart from the yoke protrusion portions 71b, 71b, or a contact state with the yoke protrusion portions 71b, 71b weakens.

When the operation lever 74 is rotated, the extension portion 56h of the lock lever 56B is pressed by the presser protrusion portion 74c so that the lock lever 56A is rotated from the lock position to the unlock position, and the lock protrusion portion 56i is set apart from the first engagement portion 40a of the engagement piece portion 40 so as to release the engagement.

At this time, the bias force of the lock spring 57 is increased along with the rotation of the lock lever 56B.

Figure 28:
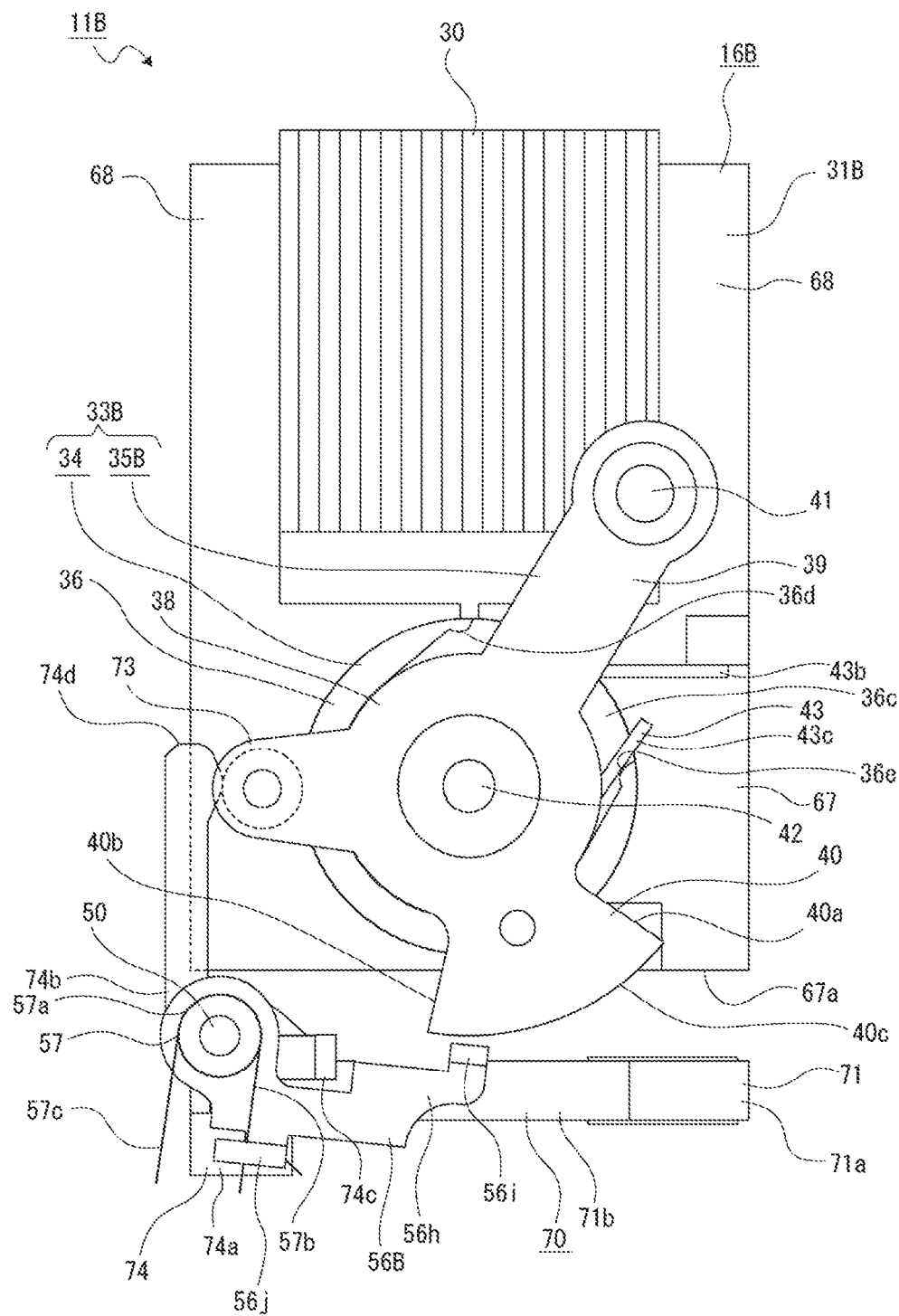
FIG. 28 A rear view showing a state immediately before the lock protrusion portion engages with the second engagement portion of the engagement piece portion.

Since the engagement between the lock protrusion portion 56i and the first engagement portion 40a is released as described above, the lock on the first opening/closing blade 19 is released, and the magnet 29 to which the rotational force is imparted is rotated integrally with the driving body 33B (see FIG. 28).

As the magnet 29 is rotated integrally with the driving body 33B, the arm protrusion portion 74d of the operation lever 74 is pressed by the rotation protrusion portion 73 of the driving lever 35B, and the operation lever 74 is rotated in a direction in which the presser protrusion portion 74c approaches the lever holding portion 36 against the bias force of the return spring 51.

At this time, the lock lever 56B is rotated in the direction in which the lock protrusion portion 56i approaches the lever holding portion 36 by the lock spring 57 and is in a state where the lock protrusion portion 56i is in contact with the sliding portion 40c of the engagement piece portion 40. Therefore, the lock protrusion portion 56i of the lock lever 56B slides on the sliding portion 40c along with the rotation of the driving lever 35B.

Figure 29:
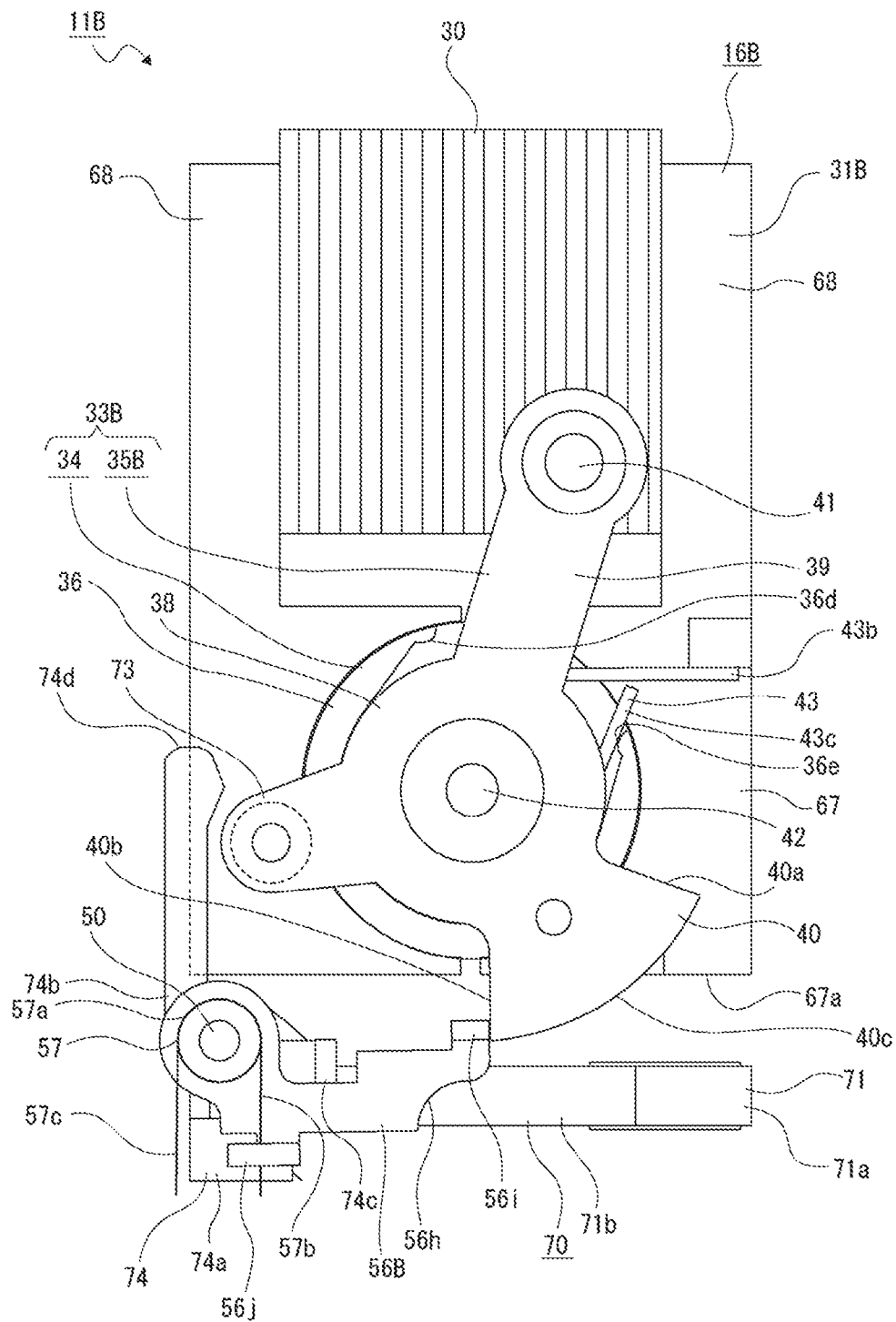
FIG. 29 A rear view showing a state where the lock protrusion portion is engaged with the second engagement portion of the engagement piece portion.

When the magnet 29 is further rotated integrally with the driving body 33, the sliding of the lock protrusion portion 56i of the lock lever 56B on the sliding portion 40c is released by the rotation of the driving body 33B, and the lock protrusion portion 56i is rotated in the direction in which it approaches the lever holding portion 36 by the bias force of the lock spring 57, so that the lock lever 56B moves from the unlock position to the lock position again (see FIG. 29). When the lock lever 56B is rotated, the lock protrusion portion 56i engages with the second engagement portion 40b of the engagement piece portion 40. When the lock protrusion portion 56i is engaged with the second engagement portion 40b, the energization to the coil 30 is stopped and the rotation of the magnet 29 and the driving body 33 is stopped.

By the lock protrusion portion 56i of the lock lever 56B engaging with the second engagement portion 40b in this way, a rotation of the magnet 29 in a direction opposite to that described above is restricted. At this time, the first opening/closing blade 19 is already moved to the closing position, and the first opening/closing blade 19 is locked at the closing position.

It should be noted that although the lock operation regarding the first opening/closing blade 19 has been described above, the locked state is set at the opening position or the closing position by an operation similar to that described above also regarding the second opening/closing blade 20.

Meanwhile, when the magnet 29 is rotated in the opposite direction and the first opening/closing blade 19 is moved toward the opening position in a state where the first opening/closing blade 19 is at the closing position, the magnetic circuit portion 70, the lock lever 56B, and the operation lever 74 are operated in a manner similar to that described above, and the engagement of the lock protrusion portion 56g with the second engagement portion 40b is released. Next, the lock protrusion portion 56g slides on the sliding portion 40c, and then the lock protrusion portion 56g engages with the first engagement portion 40a.

As described above, in the blade opening/closing apparatus 11B, the magnetic circuit portion 70 that generates a driving force to be imparted to the lock lever 56B functioning as the lock portion by the energization to the coil 30 is provided.

Therefore, since the lock lever 56B is operated by the magnetic circuit portion 70, the driving body 33B including the engagement piece portion 40 functioning as the to-be-locked portion is operated by the first magnetic driving portion 16B or the second magnetic driving portion 17B, and the driving force generated in the magnetic circuit portion 70 and the driving force generated in the first magnetic driving portion 16B or the second magnetic driving portion 17B are generated by energization to the same coil 30, operational control of the lock lever 56B and the driving body 33B is performed separately while reducing the number of components, and thus operational reliability can be improved while securing simplification of the structure.

<One Embodiment of Image Pickup Apparatus>

Figure 30:
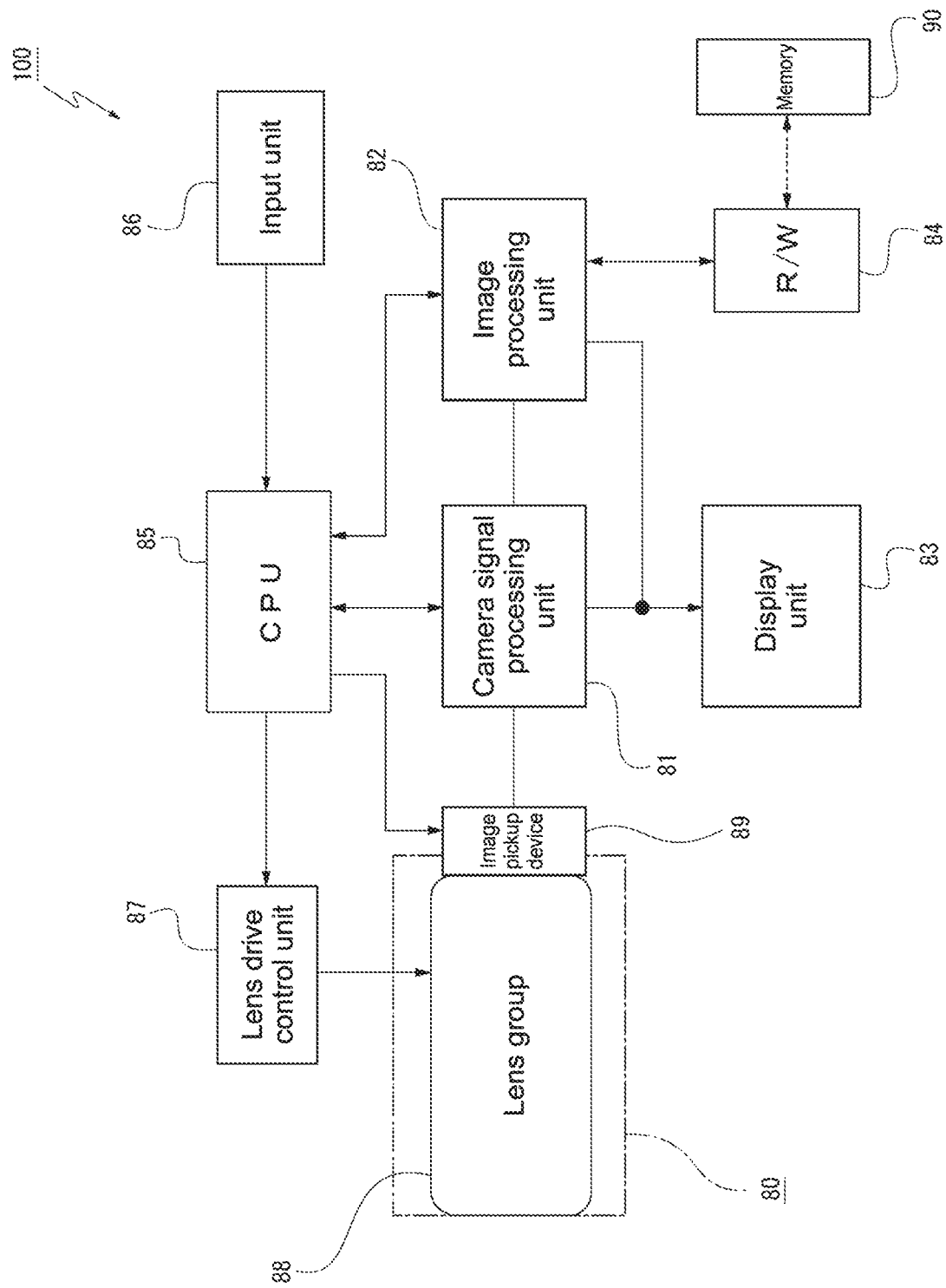
FIG. 30 A block diagram of the image pickup apparatus.

FIG. 30 is a block diagram showing a still camera (digital still camera) according to an embodiment of an image pickup apparatus of the present technology.

An image pickup apparatus (digital still camera) 100 (image pickup apparatus 1) includes a camera block 80 including an image pickup function, a camera signal processing unit 81 that carries out signal processing such as an analog-digital conversion on captured image signals, and an image processing unit 82 that carries out recording/reproducing processing of the image signals. In addition, the image pickup apparatus 100 includes a display unit 83 (display 7) that displays a captured image and the like, an R/W (reader/writer) 84 that writes and reads out image signals to/from a memory 90, a CPU (Central Processing Unit) 85 that performs overall control of the image pickup apparatus 100, an input unit 86 including various switches and the like, to which necessary operations are performed by a user (shutter button 4, zoom switch 5, power button 6, and operation portions 8, 8, . . . ), and a lens drive control unit 87 that controls drive lenses arranged in the camera block 80.

The camera block 80 is constituted of an optical system (optical system 10) including a lens group 88, an image pickup device 89 (image pickup device 12) such as CCD (Charge Coupled Device) and CMOS (Complementary Metal-Oxide Semiconductor), and the like.

The camera signal processing unit 81 carries out various types of signal processing such as a conversion into digital signals, noise removal, image quality correction, and conversion into luminance/color difference signals, on output signals from the image pickup device 89.

The image processing unit 82 carries out compression coding/decompression decoding processing on image signals based on a predetermined image data format, processing of converting a specification of data of a resolution and the like, and the like.

The display unit 83 includes a function of displaying various types of data such as an operation state of the user with respect to the input unit 86 and a captured image.

The R/W 84 writes image data encoded by the image processing unit 82 in the memory 90 and reads out image data recorded in the memory 90.

The CPU 85 functions as a control processing unit that controls respective circuit blocks provided in the image pickup apparatus 100, and controls the respective circuit blocks on the basis of an instruction input signal or the like from the input unit 86.

The input unit 86 outputs an instruction input signal corresponding to the user operation to the CPU 85.

The lens drive control unit 87 controls a motor (not shown) that drives each lens of the lens group 88 on the basis of a control signal from the CPU 85, and the like.

The memory 90 is, for example, a semiconductor memory that is detachable from a slot connected to the R/W 84.

Hereinafter, an operation of the image pickup apparatus 100 will be described.

In a photograph standby state, image signals captured by the camera block 80 are output to the display unit 83 via the camera signal processing unit 81 and displayed as a camera-through image under control of the CPU 85. Further, when an instruction input signal for zooming is input from the input unit 86, the CPU 85 outputs a control signal to the lens drive control unit 87, and a predetermined lens of the lens group 88 is moved under control of the lens drive control unit 87.

When a shutter (blade opening/closing apparatus 11) of the camera block 80 is operated by the instruction input signal from the input unit 86, captured image signals are output from the camera signal processing unit 81 to the image processing unit 82 to be subjected to compression coding processing, and the signals are converted into digital data of a predetermined data format. The converted data is output to the R/W 84 and written in the memory 90.

Focusing is carried out by the lens drive control unit 87 moving a predetermined lens of the lens group 88 on the basis of a control signal from the CPU 85.

In a case where image data recorded in the memory 90 is to be reproduced, predetermined image data is read out from the memory 90 by the R/W 84 in accordance with an operation to the input unit 86, and after the image processing unit 82 carries out decompression decoding processing, reproduction image signals are output to the display unit 83 so that a reproduction image is displayed.

CONCLUSION

As described above, in the blade opening/closing apparatuses 11, 11A, 11B, the driving bodies 33, 33B each including the engagement piece portion 40 functioning as the to-be-locked portion and the lock levers 56, 56A, 56B each functioning as the lock portion that sets a locked state of the first opening/closing blade 19 or the second opening/closing blade 20 by engaging with the engagement piece portion 40 are provided, and the setting of the locked state and a release of the locked state are performed in accordance with the rotation position of the magnet 29.

Therefore, since the setting of the locked state and a release of the locked state are performed by the lock portion engaging with the to-be-locked portion in accordance with the rotation position of the magnet 29, the locking on the first opening/closing blade 19 or the second opening/closing blade 20 is not performed by the magnetic force of the magnet 29, and thus a favorable photographing state can be secured without causing an increase of power consumption.

Further, the lock levers 56, 56A, 56B each functioning as the lock portion are moved between the lock position for setting the locked state and the unlock position for unlocking the locked state in accordance with a change in the magnetic force caused by the rotation of the magnet 29.

Therefore, since the lock portion and the to-be-locked portion are operated by the first opening/closing blade 19 or the second opening/closing blade 20, different driving portions for operating the lock portion and the to-be-locked portion are not required, and the first opening/closing blade 19 and the second opening/closing blade 20 can be locked while simplifying the structure.

Further, since the rotary shaft of the magnet 29 and the rotary shaft of the driving bodies 33, 33B are coaxial, the magnet 29 and the driving bodies 33, 33B are rotated using the same rotary shaft as a fulcrum, and thus miniaturization due to a reduction in space can be realized while simplifying the structure.

Furthermore, since the driving bodies 33, 33B are fixed to the magnet 29, the magnet 29 and the driving bodies 33, 33B are rotated integrally using the same rotary shaft as a fulcrum, with the result that facilitation of control, simplification of the structure, and miniaturization due to a reduction in space can be realized.

Moreover, the first opening/closing blade 19 and the second opening/closing blade 20 are moved between the opening position at which the aperture 13a of the base body 13 is opened and the closing position at which the aperture 13a is closed, and the locked states are respectively set at the opening position and the closing position.

Therefore, the first opening/closing blade 19 and the second opening/closing blade 20 are locked at two positions, that is, the opening position and the closing position, by a single mechanism including the lock portion and the to-be-locked portion, and thus the simplification of the structure and miniaturization can be realized.

Further, since the first engagement portion 40a with which the lock portion is to be engaged at the opening position and the second engagement portion 40b with which the lock portion is to be engaged at the closing position are formed in the engagement piece portion 40 functioning as the to-be-locked portion, two engagement portions for locking at the two positions are formed in the to-be-locked portion, and thus the number of components can be reduced, and miniaturization can be realized.

Furthermore, the driving bodies 33, 33B are provided with the driving levers 35, 35B that are coupled to the first opening/closing blade 19 or the second opening/closing blade 20, and the engagement piece portion 40 that functions as the to-be-locked portion is provided in the driving levers 35, 35B.

Therefore, since the first engagement portion 40a and the second engagement portion 40b are formed in the driving levers 35, 35B coupled to the first opening/closing blade 19 or the second opening/closing blade 20, the driving lever 35, 35B include two functions, that is, the function of operating the first opening/closing blade 19 or the second opening/closing blade 20 and the function of being locked, and thus the number of components can be reduced.

In addition, the engagement piece portion 40 functioning as the to-be-locked portion is provided in the driving levers 35, 35B, and both ends of the engagement piece portion 40 are respectively formed as the first engagement portion 40a and the second engagement portion 40b. Therefore, the lock portion engages with each of the both ends of the engagement piece portion 40 to be locked at the two positions, with the result that the structure for locking at the two positions can be simplified with a simple structure.

<Others>

In the blade opening/closing apparatuses 11, 11A, 11B described above, when the lock protrusion portions 56b, 56g, 56i of the lock levers 56, 56A, 56B slide on the sliding portion 40c of the engagement piece portion 40 at the time the driving bodies 33, 33B rotate, there is a possibility that a noise due to sliding (shutter sound) will be generated and this generated noise will become an abnormal noise. In this regard, in order to reduce or prevent this noise due to sliding from being generated or change a tone color, for example, a timing of rotating the lock levers 56, 56A, 56B with respect to the driving bodies 33, 33B may be changed, or materials of the lock levers 56, 56A, 56B and the engagement piece portion 40 may be changed.

<Present Technology>

The present technology can also take the following configurations.

(1)

A blade opening/closing apparatus, including:

a magnetic driving portion including a coil to which a driving current is supplied and a magnet that is rotated along with energization to the coil;

a driving body that includes a to-be-locked portion and is operated by the magnetic driving portion;

an opening/closing blade that opens/closes an aperture by an operation of the driving body; and a lock portion that sets a locked state of the opening/closing blade by engaging with the to-be-locked portion, the setting of the locked state and a release of the locked state being carried out in accordance with a rotation position of the magnet.

(2)

The blade opening/closing apparatus according to (1), in which the lock portion is moved between a lock position at which the locked state is set and an unlock position at which the locked state is released, in accordance with a change of a magnetic force accompanying the rotation of the magnet.

(3)

The blade opening/closing apparatus according to (2), in which the magnetic driving portion includes a fixed yoke and a movable yoke, and the lock portion is moved between the lock position and the unlock position by an operation of the movable yoke.

(4)

The blade opening/closing apparatus according to (2) or (3), further including a rotatable lock lever as the lock portion, and a rotatable operation lever that causes the lock lever to rotate from the lock position to the unlock position, in which a rotary shaft of the lock lever and a rotary shaft of the operation lever are coaxial.

(5)

The blade opening/closing apparatus according to any one of (1) to (4), in which a rotary shaft of the magnet and a rotary shaft of the driving body are coaxial.

(6)

The blade opening/closing apparatus according to (5), in which the driving body is fixed to the magnet.

(7)

The blade opening/closing apparatus according to (1), in which the opening/closing blade is moved between an opening position at which the aperture is opened and a closing position at which the aperture is closed, and the locked state is set at each of the opening position and the closing position.

(8)

The blade opening/closing apparatus according to (7), in which the to-be-locked portion includes a first engagement portion that engages with the lock portion at the opening position and a second engagement portion that engages with the lock portion at the closing position.

(9)

The blade opening/closing apparatus according to (8), in which the driving body includes a driving lever coupled to the opening/closing blade, and the driving lever includes the to-be-locked portion.

(10)

The blade opening/closing apparatus according to (9), in which the driving lever includes an engagement piece portion that functions as the to-be-locked portion, and both ends of the engagement piece portion are respectively formed as the first engagement portion and the second engagement portion.

(11)

The blade opening/closing apparatus according to any one of (1) to (10), further including a power assist spring that applies a bias force to the driving body in an operation direction of the driving body.

(12)

The blade opening/closing apparatus according to (1) or (2), further including an actuator that causes the lock portion to operate.

(13)

The blade opening/closing apparatus according to (1) or (2), further including a magnetic circuit portion that generates a driving force to be applied to the lock portion by energization to the coil.

(14)

The blade opening/closing apparatus according to any one of (1) to (13), in which two opening/closing blades are provided and operated in a direction in which the opening/closing blades are set apart from each other, and two magnetic driving portions, driving bodies, and lock portions are provided while being arranged symmetrically in correspondence with the two opening/closing blades.

(15)

An image pickup apparatus, including:

a blade opening/closing apparatus that controls light taken in inside via an optical system; and an image pickup device that photoelectrically converts the light taken in via the optical system, the blade opening/closing apparatus including a magnetic driving portion including a coil to which a driving current is supplied and a magnet that is rotated along with energization to the coil, a driving body that includes a to-be-locked portion and is operated by the magnetic driving portion, an opening/closing blade that opens/closes an aperture by an operation of the driving body, and a lock portion that sets a locked state of the opening/closing blade by engaging with the to-be-locked portion, the setting of the locked state and a release of the locked state being carried out in accordance with a rotation position of the magnet.

REFERENCE SIGNS LIST 1 image pickup apparatus
10 optical system
11 blade opening/closing apparatus
12 image pickup device
13a aperture
16 first magnetic driving portion
17 second magnetic driving portion
19 first opening/closing blade
20 second opening/closing blade
29 magnet
30 coil
31 fixed yoke
32 movable yoke
33 driving body
35 driving lever
40 engagement piece portion (to-be-locked portion)
40a first engagement portion
40b second engagement portion
43 power assist spring
56 lock lever (lock portion)
11A blade opening/closing apparatus
16A first magnetic driving portion
17A second magnetic driving portion
31A fixed yoke
66 actuator
56A lock lever (lock portion)
11B blade opening/closing apparatus
16B first magnetic driving portion
17B second magnetic driving portion
31B fixed yoke 70 magnetic circuit portion
33B driving body
35B driving lever
56B lock lever (lock portion)
100 image pickup apparatus
89 image pickup device

The invention claimed is:

1. A blade opening/closing apparatus, comprising:
a magnetic driving portion, wherein the magnetic driving portion includes:
a coil to which a driving current is supplied, and
a magnet that is rotated along with energization to the coil;
a driving body that includes a to-be-locked portion, wherein the magnetic driving portion is configured to operate the driving body;
a power assist spring configured to apply a bias force to the driving body in an operation direction of the driving body;
an aperture;
an opening/closing blade configured to one of open or close the aperture based on an operation of the driving body; and
a lock portion configured to one of set a locked state of the opening/closing blade or release the locked state of the opening/closing blade by engagement with the to-be-locked portion, wherein each of the set of the locked state and the release of the locked state is based on a rotation position of the magnet.

2. The blade opening/closing apparatus according to claim 1,
wherein
the lock portion comprises a lock position at which the locked state is set and an unlock position at which the locked state is released,
the lock portion is movable between the lock position and the unlock position based on a change of a magnetic force, and
the change of magnetic force is based on the rotation of the magnet.

3. The blade opening/closing apparatus according to claim 2,
wherein
the magnetic driving portion further includes a fixed yoke and a movable yoke, and
the lock portion is movable between the lock position and the unlock position based on an operation of the movable yoke.

4. The blade opening/closing apparatus according to claim 2,
wherein
the lock portion is a rotatable lock lever,
the blade opening/closing apparatus further includes a rotatable operation lever configured to rotate the rotatable lock lever from the lock position to the unlock position, and
a rotary shaft of the rotatable lock lever and a rotary shaft of the rotatable operation lever are coaxial.

5. The blade opening/closing apparatus according to claim 1, wherein a rotary shaft of the magnet and a rotary shaft of the driving body are coaxial.

6. The blade opening/closing apparatus according to claim 5, wherein the driving body is fixed to the magnet.

7. The blade opening/closing apparatus according to claim 1,
wherein
the opening/closing blade is movable between an opening position at which the aperture is opened and a closing position at which the aperture is closed, and
the lock portion is further configured to set the locked state at each of the opening position and the closing position.

8. The blade opening/closing apparatus according to claim 7,
wherein
the to-be-locked portion includes a first engagement portion configured to engage with the lock portion at the opening position and a second engagement portion configured to engage with the lock portion at the closing position.

9. The blade opening/closing apparatus according to claim 8,
wherein
the driving body further includes a driving lever coupled to the opening/closing blade, and
the driving lever includes the to-be-locked portion.

10. The blade opening/closing apparatus according to claim 9,
wherein
the to-be-locked portion is an engagement piece portion, and
a first end of the engagement piece portion is the first engagement portion and a second end of the engagement piece portion is the second engagement portion.

11. The blade opening/closing apparatus according to claim 1, further comprising an actuator configured to operate the lock portion.

12. The blade opening/closing apparatus according to claim 1, further comprising a magnetic circuit portion configured to generate a driving force to be applied to the lock portion, wherein the driving force is generated based on the energization to the coil.

13. An image pickup apparatus, comprising:
a blade opening/closing apparatus configured to
receive light from an optical system, and
control the light received from the optical system; and
an image pickup device configured to photoelectrically convert the light,
the blade opening/closing apparatus including:
a magnetic driving portion, wherein the magnetic driving portion includes:
a coil to which a driving current is supplied, and
a magnet that is rotated along with energization to the coil,
a driving body that includes a to-be-locked portion, wherein the magnetic driving portion is configured to operate the driving body,
a power assist spring configured to apply a bias force to the driving body in an operation direction of the driving body;
an aperture;
an opening/closing blade configured to one of open or close the aperture based on an operation of the driving body; and
a lock portion configured to one of set a locked state of the opening/closing blade or release the locked state of the opening/closing blade by engagement with the to-be-locked portion, wherein each of the set of the locked state and the release of the locked state is based on a rotation position of the magnet.

* * * * *